US009521548B2

(12) United States Patent
Fosmark et al.

(10) Patent No.: US 9,521,548 B2
(45) Date of Patent: Dec. 13, 2016

(54) SECURE REGISTRATION OF A MOBILE DEVICE FOR USE WITH A SESSION

(75) Inventors: Klaus S. Fosmark, Frisco, TX (US); William A. Perry, Jr., Addison, TX (US)

(73) Assignee: NEXIDEN, INC., Plano, TX (US)

( * ) Notice: Subject to any disclaimer, the term of this patent is extended or adjusted under 35 U.S.C. 154(b) by 456 days.

(21) Appl. No.: 13/476,864

(22) Filed: May 21, 2012

(65) Prior Publication Data

US 2013/0308778 A1 Nov. 21, 2013

(51) Int. Cl.
*H04W 12/06* (2009.01)
*H04L 29/06* (2006.01)
*H04W 12/12* (2009.01)
*G06F 21/41* (2013.01)
*G06Q 20/32* (2012.01)

(52) U.S. Cl.
CPC .......... *H04W 12/06* (2013.01); *H04L 63/0823* (2013.01); *G06F 21/41* (2013.01); *G06F 2221/2103* (2013.01); *G06F 2221/2115* (2013.01); *G06Q 20/322* (2013.01); *H04W 12/12* (2013.01)

(58) Field of Classification Search
CPC .............. G06F 21/41; G06F 2221/2103; G06F 2221/2115; H04L 63/0823; G06Q 20/322; H04W 12/06; H04W 12/12
USPC ........... 713/168–170; 380/270; 455/411, 410
See application file for complete search history.

(56) References Cited

U.S. PATENT DOCUMENTS

| | | | |
|---|---|---|---|
| 5,708,422 A | 1/1998 | Blonder et al. | |
| 5,892,900 A | 4/1999 | Ginter et al. | |
| 6,006,663 A | 12/1999 | Kropp et al. | |
| 7,069,248 B2 | 6/2006 | Huber | |
| 7,373,515 B2 | 5/2008 | Owen et al. | |
| 7,628,318 B2 | 12/2009 | Melick et al. | |
| 7,697,920 B1 | 4/2010 | McClain | |
| 8,160,496 B2* | 4/2012 | Satou | 455/41.2 |
| 8,256,664 B1 | 9/2012 | Balfanz et al. | |
| 8,272,038 B2* | 9/2012 | Husemann et al. | 726/3 |
| 8,307,202 B2* | 11/2012 | Heinonen et al. | 713/156 |
| 8,346,672 B1* | 1/2013 | Weiner et al. | 705/75 |
| 8,380,177 B2 | 2/2013 | Laracey | |
| 8,387,121 B1 | 2/2013 | Surti | |
| 8,463,239 B1* | 6/2013 | Koller et al. | 455/411 |
| 8,522,019 B2* | 8/2013 | Michaelis | 713/168 |
| 8,607,050 B2* | 12/2013 | Hans et al. | 713/168 |

(Continued)

OTHER PUBLICATIONS

"Tiqr Techincal", retrieved May 2, 2012, available at https://tiqr.org/technical/.

(Continued)

*Primary Examiner* — Nirav B Patel

(57) ABSTRACT

A computer-readable medium embodies a computer program for registering a mobile device. The computer program comprises computer-readable program code for: generating a first message including a first code in response to receiving a request to register the mobile device for use with a future session with an entity, sending the first message including the first code, receiving a second message including the first code and at least a portion encrypted using a private key associated with the mobile device, and registering the mobile device for use with the future session based on at least the portion of the second message being encrypted using the private key associated with the mobile device.

30 Claims, 18 Drawing Sheets

NETWORKED SYSTEM
100

(56) References Cited

U.S. PATENT DOCUMENTS

| | | | |
|---|---|---|---|
| 8,719,952 B1 * | 5/2014 | Damm-Goossens | H04L 9/0825 380/285 |
| 8,869,248 B2 * | 10/2014 | Moosavi | H04L 9/3228 380/270 |
| 8,879,994 B2 * | 11/2014 | Brown et al. | 455/41.3 |
| 2002/0116329 A1 | 8/2002 | Serbetcioglu et al. | |
| 2003/0009549 A1 | 1/2003 | Maehiro | |
| 2004/0006710 A1 | 1/2004 | Pollutro et al. | |
| 2004/0145661 A1 | 7/2004 | Murakami et al. | |
| 2005/0015601 A1 | 1/2005 | Tabi | |
| 2005/0021969 A1 | 1/2005 | Williams et al. | |
| 2005/0113069 A1 * | 5/2005 | Knauerhase et al. | 455/411 |
| 2005/0120232 A1 | 6/2005 | Hori et al. | |
| 2005/0125301 A1 | 6/2005 | Muni | |
| 2005/0203854 A1 | 9/2005 | Das et al. | |
| 2006/0025110 A1 | 2/2006 | Liu | |
| 2006/0105741 A1 * | 5/2006 | Suh et al. | 455/410 |
| 2007/0006299 A1 | 1/2007 | Elbury et al. | |
| 2007/0022058 A1 | 1/2007 | Labrou et al. | |
| 2007/0162402 A1 | 7/2007 | Hoij | |
| 2007/0214224 A1 | 9/2007 | Nam et al. | |
| 2008/0229407 A1 | 9/2008 | Nakatomi | |
| 2008/0307515 A1 | 12/2008 | Drokov et al. | |
| 2009/0288148 A1 | 11/2009 | Headley et al. | |
| 2009/0300745 A1 | 12/2009 | Dispensa | |
| 2010/0211503 A1 | 8/2010 | Reiss | |
| 2010/0257357 A1 | 10/2010 | McClain | |
| 2011/0126010 A1 | 5/2011 | Kim et al. | |
| 2011/0218871 A1 | 9/2011 | Singh | |
| 2011/0219230 A1 | 9/2011 | Oberheide et al. | |
| 2011/0219427 A1 | 9/2011 | Hito et al. | |
| 2011/0302627 A1 | 12/2011 | Blom et al. | |
| 2012/0284187 A1 | 11/2012 | Hammad et al. | |
| 2013/0023241 A1 * | 1/2013 | Lim | 455/411 |
| 2013/0067243 A1 | 3/2013 | Tamayo-Rios et al. | |
| 2013/0113605 A1 * | 5/2013 | Hristov et al. | 340/10.1 |
| 2013/0124422 A1 * | 5/2013 | Hubert et al. | 705/71 |
| 2013/0179681 A1 * | 7/2013 | Benson et al. | 713/155 |
| 2014/0074623 A1 | 3/2014 | Mohammadi et al. | |
| 2014/0100973 A1 * | 4/2014 | Brown et al. | 705/17 |
| 2014/0143078 A1 * | 5/2014 | Meehan | 705/21 |

OTHER PUBLICATIONS

"How to Login to Gmail Securely With a QR Code," uploaded by "myjailbreakmovies" on Jan. 16, 2012 to YouTube, available at http://www.youtube.com/watch?feature=player_embed.

Office Action dated Jul. 18, 2014 in connection with U.S. Appl. No. 13/476,890, 20 pages.

Office Action dated Jun. 1, 2015 in connection with U.S. Appl. No. 13/476,886.

Shintaro Mizuno, et al., "Authentication Using Multiple Communication Channels", DIM'05, Nov. 11, 2005, p. 54-62.

Office Action dated Feb. 12, 2015 in connection with U.S. Appl. No. 13/476,890.

Office Action dated Feb. 24, 2015 in connection with U.S. Appl. No. 13/476,886.

Joy Ying Zhang, et al., "Mobile Computing Applications, and Services", Third International Conference, MobileCASE 2011, Oct. 2011, 406 pages.

Office Action dated Feb. 2, 2016 in connection with U.S. Appl. No. 13/476,886.

* cited by examiner

SECURE REGISTRATION OF A MOBILE DEVICE FOR USE WITH A SESSION

CROSS-REFERENCE TO RELATED APPLICATIONS

The present application is related to U.S. patent application Ser. No. 13/476,886, filed even date hereof, entitled "Secure Authentication of a User Using a Mobile Device" and U.S. patent application Ser. No. 13/476,890, filed even date hereof, entitled "Obtaining Information for a Payment Transaction." U.S. patent application Ser. Nos. 13/476,886 and 13/476,890 are hereby incorporated by reference into the present application as if fully set forth herein.

TECHNICAL FIELD

The present disclosure relates generally to security in user sessions and more specifically to registration of a mobile device for use with a session.

BACKGROUND

Online and identity fraud are well known problems. With the proliferation of online banking and e-commerce, there is an increasing risk that a user's online accounts may be accessed for the purpose of fraud. Given the existence of multitudes of viruses, Trojans, and other forms of malware, the web session interface to the user is increasingly becoming a less trusted way to communicate with users. It is becoming more and more important to independently verify that a transaction performed by a user was actually performed by that user and not an imposter.

SUMMARY

According to one embodiment of the present disclosure, the different illustrative embodiments provide a computer-readable medium embodying a computer program for registering a mobile device. The computer program comprises computer-readable program code for: generating a first message including a first code in response to receiving a request to register the mobile device for use with a future session with an entity, and sending the first message including the first code. The computer program also includes computer-readable program code for: receiving a second message including the first code and at least a portion encrypted using a private key associated with the mobile device, and registering the mobile device for use with the future session based on at least the portion of the second message being encrypted using the private key associated with the mobile device.

According to another embodiment of the present disclosure, the different illustrative embodiments provide a computer-readable medium embodying a computer program for registering a mobile device. The computer program comprises computer-readable program code for: identifying, using the mobile device, a first code from a first message in response to a request to register the mobile device for use with a future session with an entity, and sending a second message including the first code and at least a portion encrypted using a private key associated with the mobile device to a data processing system associated with one of the entity and a third party.

According to another embodiment of the present disclosure, the different illustrative embodiments provide a computer-readable medium embodying a computer program for confirming a transaction based on a mobile device. The computer program comprises computer-readable program code for: sending a notification message to the mobile device in response to identifying a transaction requiring confirmation from a user associated with the mobile device; and approving the transaction in response to receiving an approval message from the mobile device.

According to another embodiment of the present disclosure, the different illustrative embodiments provide a computer-readable medium embodying a computer program for confirming a transaction using a mobile device. The computer program comprises computer-readable program code for: displaying a request for approval of a transaction requiring confirmation from a user associated with the mobile device in response to receiving a notification message including the request for approval; and sending an approval message including a response to the request for approval in response to receiving an input comprising the response.

According to another embodiment of the present disclosure, the different illustrative embodiments provide a computer-readable medium embodying a computer program for confirming a transaction based on a mobile device. The computer program comprises computer-readable program code for: generating a message including a challenge code and a request for a confirmation of a transaction from a user associated with the mobile device in response to identifying the transaction requiring the confirmation, encoding the message into one of an optically-scannable image and an audio encoded message, sending the message, and approving the transaction in response to receiving a response code from the user. The message is encoded in machine readable format for identification of the challenge code by a machine. The response code is a function of the challenge code.

According to another embodiment of the present disclosure; the different illustrative embodiments provide a computer-readable medium embodying a computer program for confirming transactions using a mobile device. The computer program comprises computer-readable program code for: identifying, from a message encoded into one of an optically-scannable image and an audio message, a challenge code and a request for a confirmation of a transaction from a user associated with the mobile device in response to the transaction requiring the confirmation, and displaying a response code on the display of the mobile device. The response code is a function of the challenge code.

According to another embodiment of the present disclosure, the different illustrative embodiments provide a computer-readable medium embodying a computer program for confirming transactions using a mobile device. The computer program comprises computer-readable program code for: displaying a request for approval of a transaction requiring confirmation from a user associated with the mobile device in response to receiving a notification message including the request for approval, and receiving a response to the request for approval from the user. The computer program also includes computer-readable program code for: requesting a biometric input from the user of the mobile device to verify that the user is an authorized user of the mobile device, and sending an approval message including the response to the request for approval in response to receiving the biometric input.

Other technical features may be readily apparent to one skilled in the art from the following figures, descriptions, and claims.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

The various figures and embodiments used to describe the principles of the present invention in this patent document are by way of illustration only and should not be construed in any way to limit the scope of the inventions. Those skilled in the art will understand that the principles of the inventions may be implemented in any type of suitably arranged device or system.

Embodiments of the present disclosure provide authentication for various transaction confirmations, access sessions and information exchanges utilizing a mobile device of a user. Embodiments of the present disclosure utilize registration processes to allow a mobile device of a user to act as an authentication token for various situations. Embodiments of the present disclosure provide security and simplicity in various user sessions. Embodiments of the present disclosure provide a transaction confirmation mechanism for various transactions. Embodiments of the present disclosure reduce the requirement for users to remember passwords, user identifiers and other personal information while maintaining and/or increasing security in user sessions.

As used herein, the term "session" means an interaction between two or more entities, individuals or objects. For example, a session may refer to a session for confirming a transaction, or a session for which a user is being authenticated. In these examples, the session can be a process that may be associated with a particular physical or virtual device that can interact with a user or a mobile device of a user. In some examples, a session may be a web session or other network access session such as, for example, logging into an account, website or computer. In other examples, the session may be an embedded session to a door lock mechanism or other electronic locking device. This session may terminate as soon as access is granted or may continue.

Figure 1:
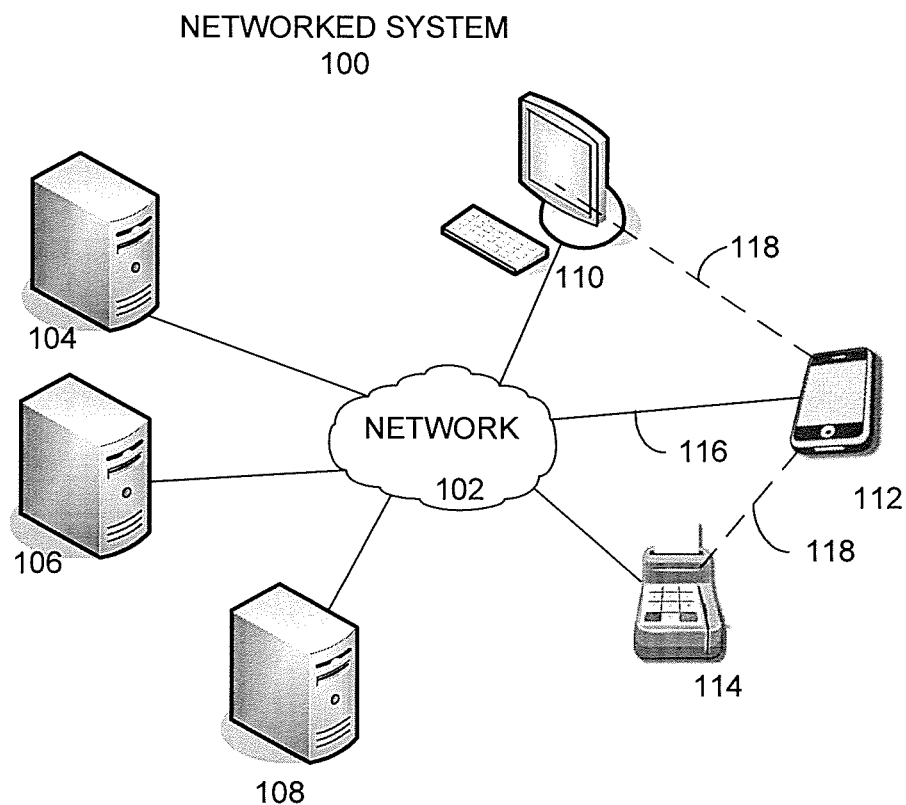
FIG. 1 illustrates a networked system of data processing systems in accordance with an illustrative embodiment.

FIG. 1 illustrates a networked system 100 of data processing systems in which various systems and methods of the present disclosure can be implemented. As shown in FIG. 1, system 100 includes network 102, which is the medium used to provide communication links between various computers and other devices. Network 102 may include any suitable connections, such as wired, wireless or fiber optic links. In some embodiments, network 102 represents at least a portion of the Internet and can include a worldwide collection of networks and gateways that use the Transmission Control Protocol/Internet Protocol suite of protocols to communicate with one another, although any other public and/or private network(s) could be used in system 100.

In this illustrative example, entity data processing system 104, trusted third party data processing system 106 and notification data processing system 108 connect to network 102. Entity data processing system 104 is a data processing system, such as a server, associated with an entity. The entity is an individual or organization with which a user desires to engage with or otherwise obtain something from. For example, without limitation, the entity may be a business the user desires to purchase something from, a provider of a service the user wants to access, an authorizer of access to an area and/or any other type of entity that a user desires to engage with or otherwise obtain something from. As specific examples, without limitation, the entity may be a retailer, a bank, a website or an authorizer of a locked area.

The trusted third party data processing system 106 is a data processing system, such as a server, associated with a trusted third party. For example, the trusted third party is an individual or organization that may provide various functions of the authentication services of the present disclosure for the entity. Notification data processing system 108 is a data processing system, such as a server, associated with a notification system. For example, the notification system 108 may provide notifications associated with authentication processes for the entity and/or the trusted third party to a user data processing system 110 and/or a mobile device 112.

Although various embodiments of the disclosure may describe activities that are performed by one of the entity data processing system 104 and the trusted third party data processing system 106, such activities may be performed by either the entity data processing system 104 or the trusted third party data processing system 106. For example, the trusted third party data processing system 106 may perform the registration and authentication procedures of the present disclosure on behalf of the entity data processing system 104. The trusted third party data processing system 106 may send, receive, approve and/or deny various activities and simply notify the entity of the actions taken. In another example, the trusted third party data processing system 106 may not exist, and all registration and authentication procedures may be implemented by the entity data processing system 104. In other examples, certain tasks are performed by the entity data processing system 104, and other tasks are performed by the trusted third party data processing system 106.

The user data processing system 110 and the mobile device 112 connect to the network 102. The user data processing system 110 may be, for example, a personal computer, a network computer, a personal digital assistant, a phone or a mobile computing device operated by or otherwise under the control of a user. The mobile device 112 is a mobile phone, a personal digital assistant or another mobile computing device of a user. In various embodiments of the present disclosure, the mobile device 112 may be registered with the entity data processing system 104 and/or the trusted third party data processing system 106 for use in various disclosed authentication processes.

A payment device 114 also connects to the network 102. The payment device 114 is a data processing system that may be used for processing of payment transactions for the entity data processing system 104. For example, the payment device 114 may include a display, a credit card reader, a register, a keypad and/or various other components associated with processing of payment transactions.

The system 100 may include multiple server data processing systems, client data processing systems, mobile devices and other devices not shown. The system 100 may be implemented using a number of different types of networks, such as, for example, the Internet, a local area network (LAN) or a wide area network (WAN). FIG. 1 is intended as an example and not as an architectural limitation for the different embodiments.

Security measures associated with various authentication and registration procedures of the present disclosure are based on asymmetric cryptography with public/private keys. Security is maintained through trust established between the entity data processing system 104 (and/or the trusted third party data processing system 106) and the mobile device 112 during registration procedures. This trust is based on keeping the private key of the mobile device 112 private within the mobile device and keeping the private key of the entity data processing system 104 (and/or the trusted third party data processing system 106) private. Furthermore, this trust is based on the storage in the mobile device 112 of the public key of the entity data processing system 104 (and/or the trusted third party data processing system 106) and the storage at the entity data processing system 104 (and/or the trusted third party data processing system 106) of the public key of the mobile device 112. Messages sent from the entity data processing system 104 or the trusted third party data processing system 106 to the mobile device 112 may be encrypted with the public key of the mobile device 112 (so only the mobile device 112 can read the message) and signed by the entity data processing system 104 or the trusted third-party data processing system 106 so that the mobile device 112 knows the message came from the entity data processing system 104 or the trusted third party data processing system 106. As used herein, the term "signed," when referring to secure messages, means that all or a portion of the message is encrypted using a private key of the signing party. Since the key is private, only the signing party could have performed the encryption; thus indicating the authenticity of the signature.

Similarly, messages sent from the mobile device 112 to the entity data processing system 104 or the trusted third party data processing system 106 may be encrypted with the public key of the entity data processing system 104 or the trusted third party data processing system 106. Thus, only the entity data processing system 104, (or the trusted third party data processing system 106) can read the message. The messages may be signed by the mobile device 112 so the entity data processing system 104 (or the trusted third party data processing system 106) knows the message came from the mobile device 112.

In some embodiments, security measures may be based on a shared-secret key-type architecture. For example, some embodiments may utilize a shared secret in challenge and response procedures to establish security of messages exchanged. In other examples, a full Diffie-Hellman key exchange may be accomplished prior to sending data.

In various embodiments of the present disclosure, the mobile device 112 utilizes an application to perform various functions for the authentication procedures of the present disclosure. For example, a user may download the application to the mobile device 112 over a network from a provider of the application. For example, the user may learn about the application from the entity that uses the authentication procedures of the present disclosure. The exact process of installing the application will depend on what type of mobile device 112 the user has (iPhone™, Android™, Blackberry™, Windows™ phone device, etc.). For each supported type of mobile device 112, the trusted third party may use a marketplace to provide the application for download.

When the application is installed, the application may run various initial registration processes. For example, the mobile device 112 can generate a random public/private key pair. This pair may be based on some pseudo random number algorithm which may be based on different sensor inputs and parameters.

The application may perform an authentication process with the trusted third party data processing system 106 before the application can securely send the public key of the mobile device 112 to the trusted third party data processing system 106 along with other configuration information that may be needed for communications and notifications. Also, the trusted third party data processing system 106 may assign the mobile device 112 a particular identifier. The trusted third party data processing system 106 and the mobile device 112 may store the exchanged information for future use.

Various embodiments utilize specific user inputs to identify that the user is indeed the proper authorized user of the mobile device 112. For example, without limitation, as part of the initiation procedures, the mobile device 112 may store an input personal identification number (PIN), a password, a biometric scan (e.g., fingerprint, image for facial recognition), a particular gesture on a touch screen of the mobile device 112, or a predetermined pattern of movement of the mobile device 112. The user inputs are stored in the mobile device 112 for later use.

In various embodiments of the present disclosure, messages received by the mobile device 112 and messages sent by the mobile device 112 may travel via different communication paths. For example, the mobile device 112 may send and/or receive information via a traditional communication path 116. The traditional communication path 116 is a network link, such as a wired, optical fiber or wireless (e.g., WiFi, cellular data network) network communication link. The mobile device 112 may receive messages over non-traditional communication paths 118. For example, the non-traditional communication paths 118 may include limited distance communication paths, such as an optical scan, a near-field communication, a limited distance point-to-point radio and/or an audible communication. These non-traditional communication paths 118 are limited distance communication paths and may require the presence of the mobile device 112 to be within a vicinity of a specific location for the mobile device 112 to obtain the information. In these examples, the use of the non-traditional communication paths 118 to ensure that the mobile device 112 is within a vicinity of a specific location may be used to add a layer of security in various registration, confirmation, authentication and payment procedures of the present disclosure.

Figure 2:
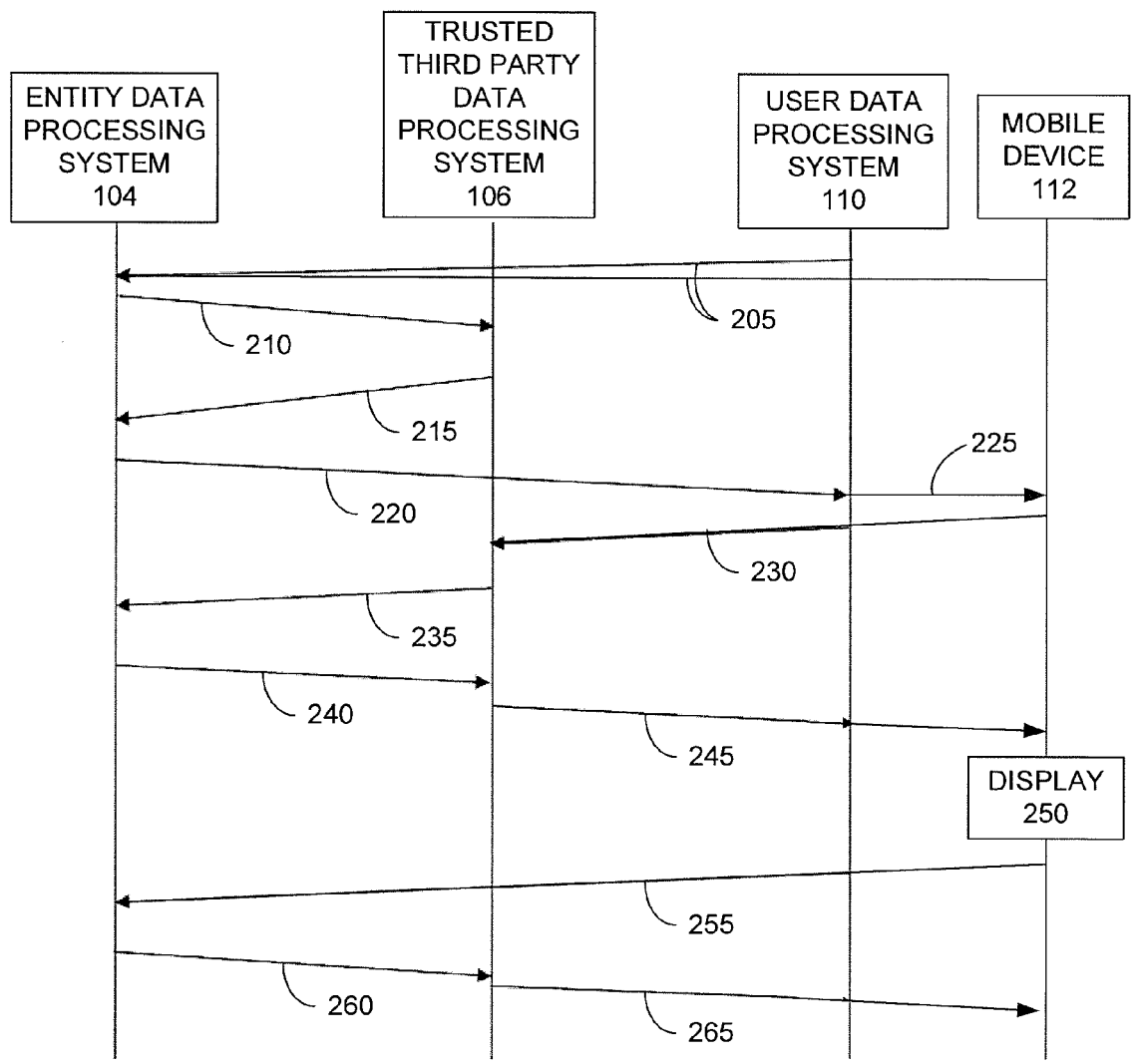
FIG. 2 illustrates a message flow diagram for registering a mobile device in accordance with an illustrative embodiment.

FIG. 2 illustrates a message flow diagram for registering a mobile device in accordance with an illustrative embodiment. The registration processes of the present disclosure are the processes of associating the mobile device 112 owned by the user with the entity data processing system 104 and/or the trusted third party data processing system 106.

The user can initiate the registration procedure 205 by selecting an input in an interface of the application on the mobile device 112 and/or an interface of the entity data processing system 104 (e.g., a website of the entity displayed on user data processing system 110, mobile device 112, or other device).

The entity data processing system 104 may then send a message 210 to the trusted third party data processing system 106 requesting registration of the mobile device 112. For example, the message 210 may include a uniform resource locator (URL) for a web address that is used for the registration. A secure sockets layer (SSL) certificate may need to exist for this URL and be signed by a Certificate Authority. The public key of this certificate can be used for future authentications. In embodiments where the trusted third party data processing system 106 does not exist, the message 210 may not be sent.

The trusted third party data processing system 106 will then generate and send a message 215 to the entity data processing system 104. The trusted third party data processing system 106 may also start a timer for response from the mobile device 112. For example, the message 215 may include an operation identifier for a type of registration procedure being performed, a random unique registration code and the contents from the message 210 received from the entity data processing system 104. In embodiments where the trusted third party data processing system 106 does not exist, the message 215 may be generated by the entity data processing system 104.

The entity data processing system 104 then provides this message 220 for receipt by the mobile device 112. For example, without limitation, contents of the message 220 may be displayed to the user on a website associated with the entity data processing system 104 as clear text (e.g., unencrypted and readable by the user) or an optically-scannable image (e.g., encoded in a QR code, bar code or other symbols that can be captured by a camera and identified by the mobile device 112), sent using near field communication (NFC) devices or other limited distance point-to-point radio, or encoded as audio to be played by a speaker of the user data processing system 110.

The mobile device 112 identifies the contents of the message (e.g., scans and decodes the optically-scannable image, captures and decodes the message from the audio received, captures and decodes the message from the data exchanged via NFC and/or user identifies the contents from clear text displayed on the user data processing system 110 and manually enters contents of the message into the mobile device 112). This identification is generally denoted as a transfer of information 225.

In embodiments where the message 220 is transferred as an optically-scannable image, this image may be a static image on a screen of a device or a series of images forming an animation or a movie on a screen of a device. In embodiments where the message 220 is transferred as an optically-scannable image, the image (or images) may be displayed on a display screen of the user data processing system 110 or a device associated with the entity data processing system 104, and the mobile device 112 receives the message through a camera or other optical sensor. Alternatively, in other examples, the image or images can be sent through an electrical connection from a user data processing system 110 or a device associated with the entity data processing system 104 to the mobile device 112. For example, the user may plug a cable into the mobile device 112.

In embodiments where the message 220 is transferred as audio, the sound may be played out of a physical speaker or another sound transducer attached to, for example, the user data processing system 110 or a device associated with the entity data processing system 104, and the mobile device 112 receives the message through a microphone or other sound or vibration sensor. In other embodiments, the audio may be "played" through an electrical connection from the user data processing system 110 or a device associated with the entity data processing system 104 to the mobile device 112. For example, the user may plug a cable into the mobile device 112.

The mobile device 112 sends a response message 230 to the trusted third party data processing system 106. For example, the response message 230 may include the random unique registration code from the message 215 and the signature of the mobile device 112, with the response message 230 encrypted with the public key for the trusted third party data processing system 106. The trusted third party data processing system 106 can match and associate the entity data processing system 104 session with the mobile device 112 session by matching the random unique registration codes. The trusted third party data processing system 106 sends a message 235 notifying the entity data processing system 104 of the association of the sessions and the public key of the mobile device 112, which may be stored and used for authentication procedures.

In embodiments where the trusted third party data processing system 106 is not used, the response message 230 may be sent directly to the entity data processing system 104 with the entity data processing system 104 performing the association of the sessions. In these examples, secure exchange of information between the entity data processing system 104 and the mobile device 112 may be accomplished using transport layer security (TLS) or SSL security protocols.

At this point, the registration of the mobile device 112 may be complete. In various embodiments, an additional encrypted message exchange with a second random code may be performed to increase security of the registration procedure. For example, the entity data processing system 104 may generate a random code (a second code) and send a message 240 with the second random code to the trusted third party data processing system 106. As a specific example, the message 240 may be encrypted with the public key for the mobile device 112 and may include the security certificate for the entity data processing system 104, which includes the public key for the entity data processing system 104 and is signed by a third party Certificate Authority, the user identifier for the identity that the user is attempting to register with the entity data processing system 104, the second code and the signature for the message by the entity data processing system 104.

The trusted third party data processing system 106 forwards the message 240 to the mobile device 112 and may include a signature of the trusted third party data processing system 106 in the forwarded message 245. Upon receipt, the mobile device 112 may perform one or more of the following actions. The mobile device 112 may identify the signature of the trusted third party data processing system 106, decrypt the message 240 forwarded from the entity data processing system 104, extract the public key of the entity data processing system 104, check the signature of the entity data processing system 104, check the validity of the security certificate, compare the URL in the security certificate with the URL previously received in the message 215 and identify the second random code from the decrypted message 240. The mobile device 112 displays 250 the second random code for the user to enter in the interface associated with the entity data processing system 104 via the user data processing system 110. The user data processing system 110 sends the entered second code to the entity data processing system 104 in a message 255.

The entity data processing system 104 compares the second code against what was sent and, if the codes match, sends a success message 260 to the trusted third party data processing system 106. The trusted third party data processing system 106 then may send a success message 265 to the mobile device 112. For example, the success message 265 is encrypted with the public key for the mobile device 112 and may include a website identifier for the entity data processing system 104 and a signature for the message using the private key of the trusted third party data processing system 106. The entity data processing system 104, the mobile device 112 and/or the trusted third party data processing system 106 store the relevant data for the registration association. As discussed above, however, the registration association can be completed without the exchange of the second code.

In some embodiments, registration of the mobile device 112 may occur without a custom phone application. For example, the message sent to the mobile device 112 may include a URL for a website where an authentication procedure is performed. Upon successful authentication, the website returns a security token (e.g., cookie) to the mobile device 112. The mobile device 112 can include the security token in subsequent messages as an identifier or a signature of the mobile device 112. The security token may be used to authenticate the mobile device 112 for a session or provide information for a user transaction.

Figure 3:
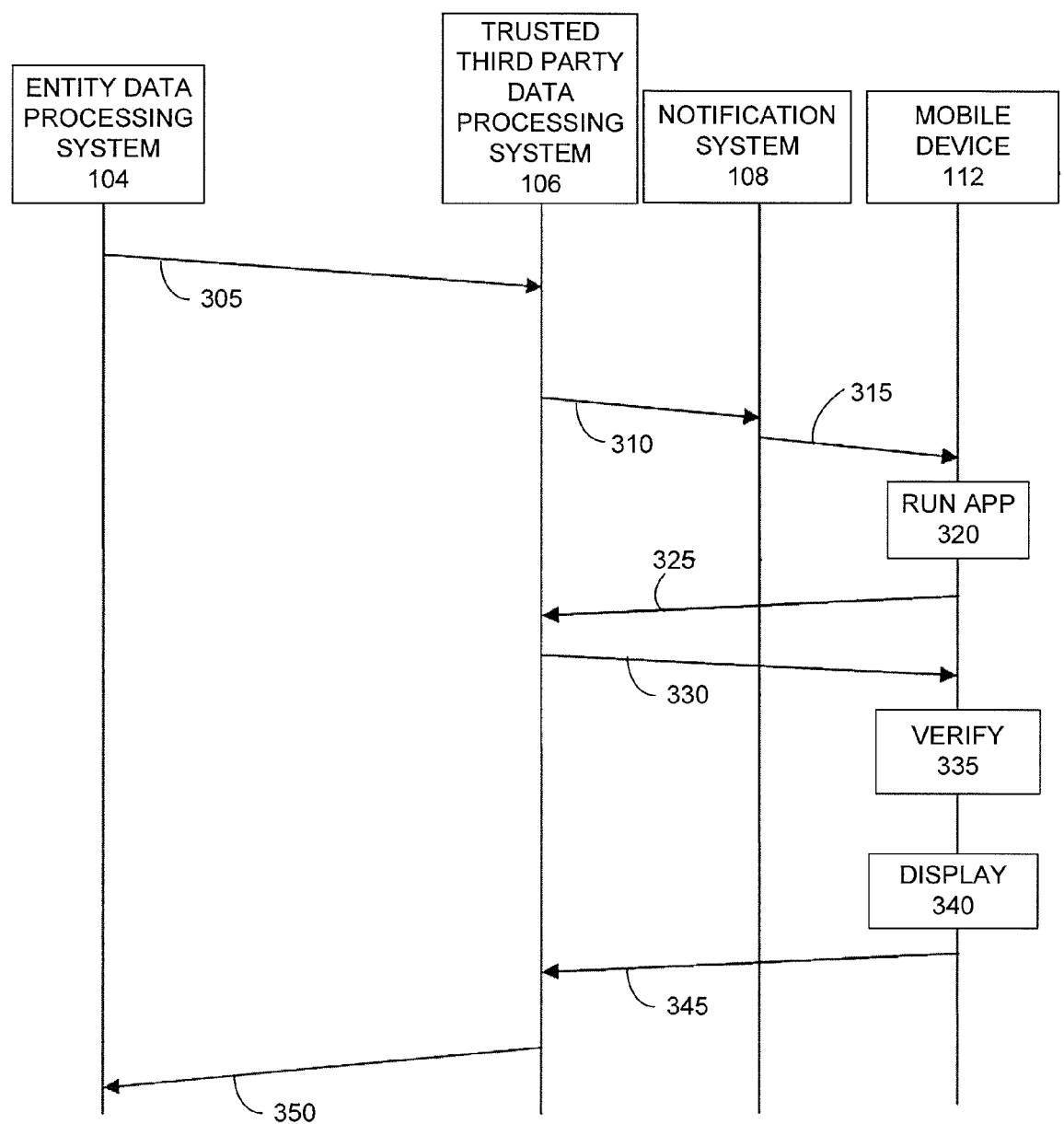
FIG. 3 illustrates a message flow diagram for confirmation of a transaction using an online mode in accordance with an illustrative embodiment.

FIG. 3 illustrates a message flow diagram for confirmation of a transaction using an online mode in accordance with an illustrative embodiment. Various embodiments of the present disclosure provide services for confirmation of a transaction using the mobile device 112. For example, to perform a certain transaction, a user may need to be in possession of the mobile device 112 to confirm the transaction. This confirmation can optionally be further qualified with one or more factors. For example, without limitation, these factors may include a PIN, a password, a biometric scan, a predetermined particular gesture on a touch screen of the mobile device 112 and a predetermined pattern of movement of the mobile device 112.

In the examples below, the mobile device 112 can be alerted of the request for the confirmation using a notification mechanism used by an operating system of the mobile device 112. Notifications may be performed by a separate entity (e.g., the notification system 108). For example, without limitation, the notification may be a pop up, an email, a text message, a banner, an automatic launch of the authentication application installed on the mobile device and/or any other type of notification.

To initiate a confirmation, the entity data processing system 104 sends a message 305 requesting the confirmation to the trusted third party data processing system 106. The message 305 may include information to be displayed on the mobile device 112 and a user identifier associated with the transaction to identify the mobile device 112 to be used for the confirmation. The information may be encrypted by the entity data processing system 104 with the public key of the mobile device 112. The trusted third party data processing system 106 will identify the information needed to reach the mobile device 112. For example, the trusted third party data processing system 106 may identify the identifier and/or the public key for the mobile device 112 obtained from an earlier registration procedure. As a particular example, the trusted third party data processing system 106 may send a message 310 to the notification system 108 to send a notification 315 to the mobile device 112. In other examples, the trusted third party data processing system 106 may send the notification 315 directly to the mobile device 112. In yet other examples, the entity data processing system 104 may send the notification 315 directly to the mobile device 112 or through the notification system 108. In this example, the entity data processing system 104 may identify information needed to contact the mobile device 112 from a previous registration procedure performed with the mobile device 112.

Upon receipt of the notification 315, the mobile device 112 may run an application 320. The mobile device 112 may perform an initialization procedure with the trusted third party data processing system 106. For example, the mobile device 112 may send a message 325 to the trusted third party data processing system 106. The information from the message 305 may be delivered to the mobile device 112 in the notification 315 or a response message 330. The information may be encrypted with the public key of the mobile device 112. In embodiments where the trusted third party data processing system 106 does not exist, the mobile device 112 can communicate directly with the entity data processing system 104.

The trusted third party data processing system 106 or the entity data processing system 104 may set a period of time at the initial connection with the mobile device 112 for the mobile device 112 to respond. If a response is not received from the mobile device 112, the trusted third party data processing system 106 may respond to the entity data processing system 104 with an appropriate error response.

Some transactions may require confirmation of multiple end users. For example, two of five users may need to approve a bank transaction. In this example, the entity data processing system 104 and/or the trusted third party data processing system 106 identifies the users that confirmation may be needed from and sends the request for confirmation to the mobile devices 112 associated with those users. Upon receipt of confirmation of the required number of users, the entity data processing system 104 may then approve the transaction. In another example, the user required to approve the transaction may not be the same user requesting the transaction. In this example, the entity data processing system 104 and/or the trusted third party data processing system 106 identifies the user that confirmation is needed from and sends the request for confirmation to that mobile device 112 associated with that user.

Upon receipt of the message 330, the mobile device 112 may decrypt the message, verify the signature using the public key of the entity data processing system 104 and display 335 a request for a user input to verify that the user is the authorized user of the device (e.g., PIN, password, biometric input, gesture, motion, etc.). For example, the user input may be requested by the entity data processing system 104 based on a security level parameter, or the user may have configured the mobile device 112 to request the user input for the entity data processing system 104 or type of transaction. In an alternative embodiment, the mobile device 112 may verify the signature of the message 330 using the public key of the trusted third party data processing system 106.

The mobile device 112 may display 340, on a display device of the mobile device 112, the information from message 305 as the request for confirmation. When receiving an input including a response to the request for confirmation, the mobile device 112 encrypts a response message 345 with the public key of the entity data processing system 104, signs the response message 345, and sends the response message 345 to the trusted third party data processing system 106. The trusted third party data processing system 106 sends the signed message 350 to the entity data processing system 104. The entity data processing system 104 may then decrypt the message and thereby identify the response from the user.

In an alternative embodiment, the response message 345 may be encrypted with the public key of the trusted third party data processing system 106 and, in this case, the trusted third party data processing system 106 will decrypt the message 345 and send a message 350 including the response to the entity data processing system 104. In embodiments where the trusted third party data processing system 106 does not exist, the mobile device 112 can communicate directly with the entity data processing system 104.

The confirmation procedures of the present disclosure may be implemented in a single-question mode. In the single-question mode, the entity data processing system 104 only needs to send the question information to be displayed on the mobile device 112 to the trusted third party data processing system 106, and the trusted third party data processing system 106 will deliver back the answer.

The confirmation procedures of the present disclosure may include message protocols for a potentially extended dialog between the entity data processing system 104 and the mobile device 112 to confirm the transaction. In this example, upon notification to the mobile device 112 of the request for confirmation, traffic may flow directly between the entity data processing system 104 and the mobile device 112. For example, upon notification, the trusted third party data processing system 106 may supply information regarding a location for the secure session. In this example, the entity data processing system 104 may be a web server. The web session between the entity data processing system 104 and mobile device 112 may be encrypted.

In another example, the traffic flow for the extended dialog may be proxied between the entity data processing system 104 and the mobile device 112 through the trusted third party data processing system 106. The proxied web session between the entity data processing system 104 and mobile device 112 may be a TLS session using a negotiated symmetric key. The TLS negotiation can be done using the previously exchanged (e.g., during registration) public keys and their respective private keys.

Figure 4:
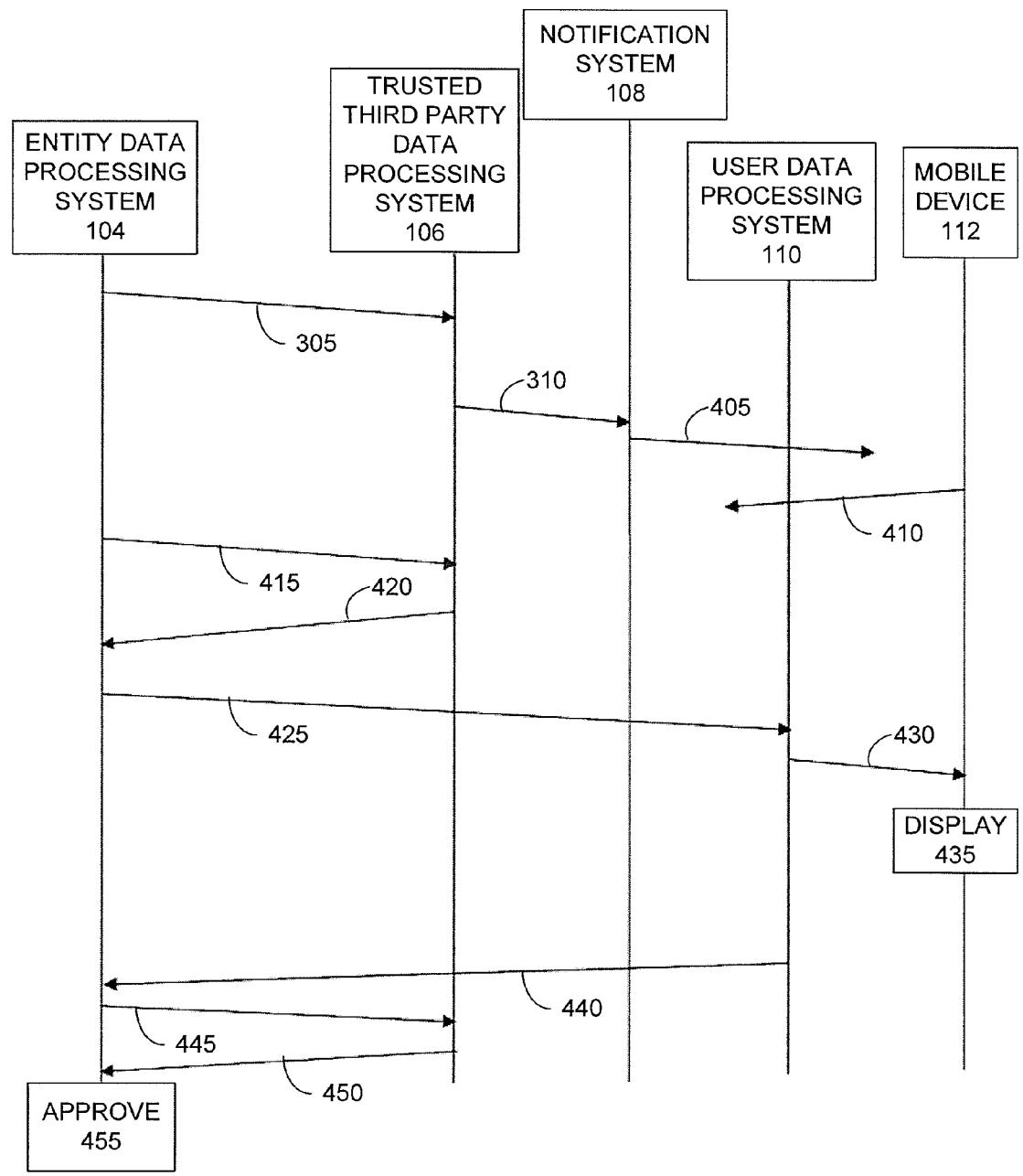
FIG. 4 illustrates a message flow diagram for a confirmation of a transaction using an offline mode in accordance with an illustrative embodiment.

FIG. 4 illustrates a message flow diagram for a confirmation of a transaction using an offline mode in accordance with an illustrative embodiment. In these illustrative embodiments, confirmation can be performed when there is lack of connectivity with the mobile device 112 (e.g., in an offline mode). For example, the offline mode may be used when a notification 405 was not successfully sent to the mobile device 112 or the mobile device 112 was unable to contact 410 the trusted third party data processing system 106.

The offline confirmation can be initiated in a number of different ways. For example, the user may request offline confirmation (even if there is connectivity). As a particular example, the user may select an offline mode from a web interface associated with the entity data processing system 104 and select the offline mode on the mobile device 112, as well. The trusted third party data processing system 106 may request the offline mode if the trusted third party data processing system 106 cannot connect to the mobile device 112 or a predetermined period of time has lapsed since the notification was sent. In another example, the entity data processing system 104 may request the offline mode.

When the offline mode is requested, the entity data processing system 104 sends a request 415 for a message from the trusted third party data processing system 106. The trusted third party data processing system 106 generates a message 420 to be provided to the mobile device 112. For example, without limitation, contents of a message 425 may be displayed to the user on a website associated with the entity data processing system 104 as an optically-scannable image, sent using near field communication (NFC) devices or other limited distance point-to-point radio, or encoded as sound played by a speaker of the user data processing system 110. The message 425 may be encrypted with the public key of the mobile device 112 and may include a website identifier for the entity data processing system 104 (e.g., URL for website associated with the entity data processing system 104), a random challenge code, the request for confirmation (e.g., text of a question to display on mobile device 112 screen) and a signature for the message by the trusted third party data processing system 106.

The mobile device 112 identifies 430 the contents of the message (e.g., scans and decodes the optically-scannable image, captures and decodes the message from the sound played or the data exchanged via NFC). The mobile device 112 may decrypt the message, check the signature to verify that the message was sent from the trusted third party data processing system 106 using the public key of the trusted third party data processing system 106 and identify the question and the challenge code. The mobile device 112 may then perform a function on the challenge code resulting in a response code. For example, this function may be a mathematical transformation, a cryptographic function, a null function (e.g., the response code is identical to the challenge code), or some other function. The mobile device 112 may then display 435 the message on the screen along with the response code. The user can respond by entering the response code into the website via the user data processing system 110 associated with the entity data processing system 104. The user data processing system 110 sends the response 440 to the entity data processing system 104. The entity data processing system 104 sends a message 445 including the response code to the trusted third party data processing system 106 for comparison with the expected response to the challenge code originally issued. The trusted third party data processing system 106 sends a message 450 to the entity data processing system 104 including a result of the comparison for the entity to approve 455 the transaction. In an alternative embodiment, the entity data processing system 104 may approve the transaction if the response code matches the expected result from what was originally sent in the message 425, and the messages 445 and 450 may not be generated or sent.

In some embodiments, the entity data processing system 104 may generate and sign message 420 or otherwise obtain the challenge code from the trusted third party data processing system 106. In this case, the mobile device 112 may check the signature to verify that the message was sent from the entity data processing system 104 using the public key of the entity data processing system 104. For example, in some embodiments, the trusted third party data processing system 106 may not exist. In these examples, the entity data processing system 104 may perform the comparison of the code from the message 440 with that in the message 420 and approve (or deny) the transaction without input from the trusted third party data processing system 106.

The procedures for multiple user confirmation single-question confirmation, extended dialog confirmation and proxied communication confirmation with regard to the online mode described above regarding FIG. 3 can be implemented in the offline mode described with regard to FIG. 4. For example, one or more of these confirmation procedures may be implemented through a website interface for the entity data processing system 104.

Figure 5:
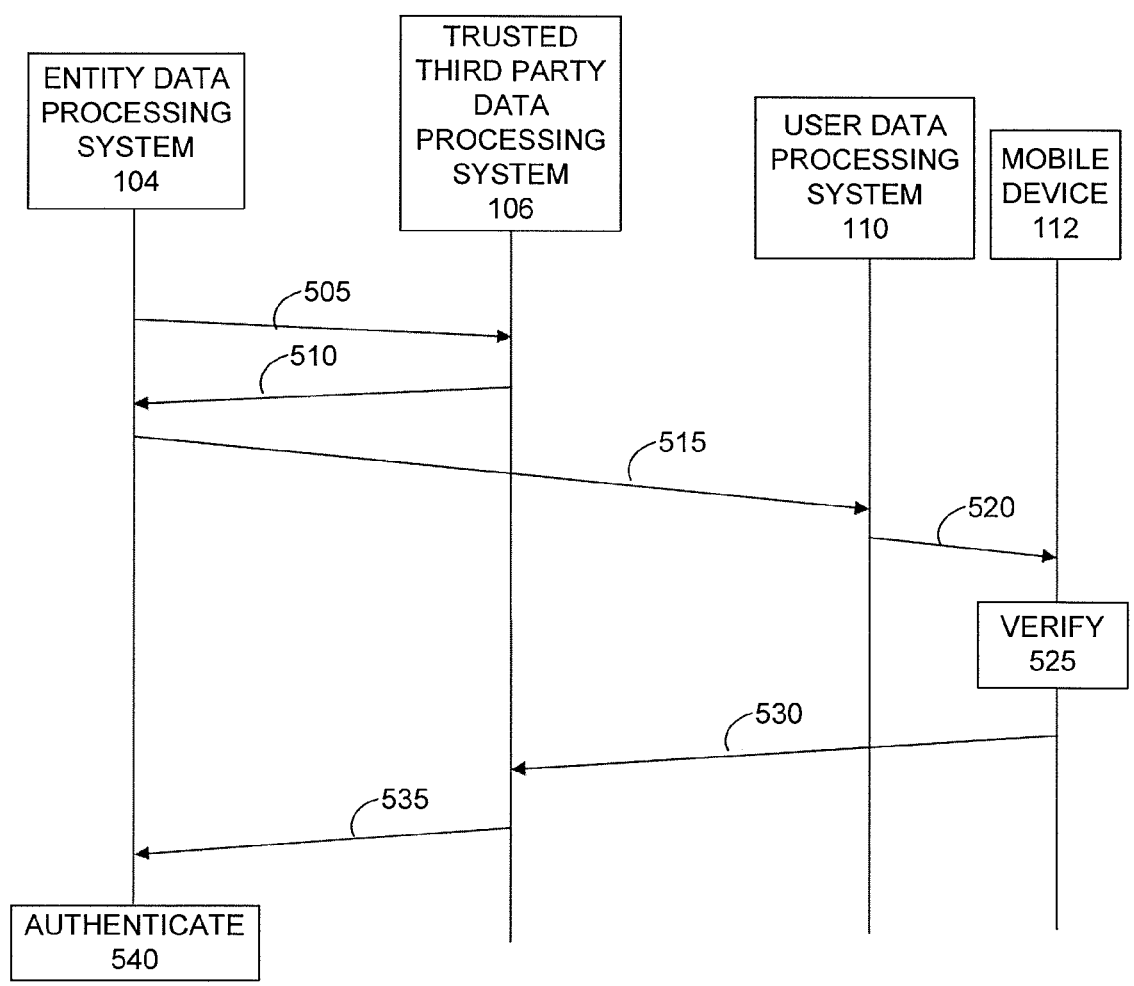
FIG. 5 illustrates a message flow diagram for authenticating a user for a session using an online mode in accordance with an illustrative embodiment.

FIG. 5 illustrates a message flow diagram for authenticating a user for a session using an online mode in accordance with an illustrative embodiment. The various embodiments authenticate a user for a session utilizing the mobile device 112 of the user. The authentication procedures of the present disclosure can reduce or remove the need to remember user identifiers and passwords to gain access to authenticated sessions. For example, the sessions for which the authentication processes of the present disclosure can be utilized include login onto a computer or a website, unlocking an electronic lock (e.g., on a door) and/or any other type of access for which a user may be authorized.

When the entity data processing system 104 needs to enable users to authenticate for a session associated with the entity data processing system 104, the entity data processing system 104 sends a message 505 to the trusted third party data processing system 106. The trusted third party data processing system 106 generates and sends a message 510 in response to the entity data processing system 104. The message 510 may include a security level identifier (e.g., whether a user input to verify the user is required, what type and how many user inputs, or whether user input requirements are to be decided according to the configuration of the mobile device 112), an identifier for the session (e.g., an identifier for the entity data processing system 104, URL of a website, an identifier for the web session or an identifier of a computer or electronic lock) and a signature for the message using the private key of the trusted third party data processing system 106.

In an alternate embodiment, message 510 may be generated by the entity data processing system 104. In this embodiment, the message 510 is signed by the entity data processing system 104.

The entity data processing system 104 sends the message 515 to be provided to the mobile device 112. For example, without limitation, contents of the message 515 may be displayed to the user on a website associated with the entity data processing system 104 as an optically-scannable image (e.g., encoded in a QR code, bar code, or other symbols that can be captured by a camera and identified by the mobile device 112), sent using near field communication (NFC) devices or other limited distance point-to-point radio, or encoded as sound played by a speaker of the user data processing system 110.

The mobile device 112 identifies 520 the contents of the message (e.g., scans and decodes the optically-scannable image, captures and decodes the message from the sound played or the data exchanged via NFC). In some embodiments, the user data processing system 110 and the mobile device 112 may be the same. For example, the user may attempt authentication using the mobile device 112 (e.g., login into a website on the mobile device 112). In these examples, the mobile device 112 may identify 520 the contents of the message 515 within the mobile device 112 itself without an actual optical scan, radio or audio transfer occurring.

The mobile device 112 may verify the signature using the public key of the trusted third party data processing system 106, identify the identifier for the session and identify the user identifier previously registered for the entity data processing system 104. If more than one identity is found (e.g., multiple logins), the mobile device 112 may present a selection menu for the user to choose a user identifier from. The mobile device 112 may display a request far confirmation of the authentication for the session. The mobile device 112 may also display a request to verify 525 that the user is an authorized user of the mobile device 112. In some embodiments, the mobile device 112 may verify the signature of the message 515 using the public key of the entity data processing system 104.

The mobile device 112 then sends a response message 530 to the trusted third party data processing system 106. The response message 530 may be encrypted with the public key for the trusted third party data processing system 106 and may include the identifier for the session, the user identifier, an identifier of the mobile device 112, a signature for the message using the private key of the mobile device 112 and a token (e.g., a cookie) identifying the mobile device 112. Upon receipt, the trusted third party data processing system 106 may verify that the signature matches the public key associated with the mobile device 112 (or verify that the token matches the token associated with the mobile device 112), match the session identifier to the active session with the entity data processing system 104 and send a message 535, including an assertion to the entity data processing system 104 of the user identifier for the session and that the user is authenticated for the session. The entity data processing system 104 then grants the user access (e.g., authenticates 540) the user for the session.

In an alternative embodiment, the contents of the message 515 are signed by the entity data processing system 104, and the message 535 is just a relay of the message 530 through the trusted third party data processing system 106. In this embodiment; the relayed message 535 is encrypted by the mobile device 112 with the public key of the entity data processing system 104.

In another alternative embodiment, the message 530 may contain a token (e.g. a cookie) identifying the mobile device from a previous registration of the mobile device 112. In this case, upon receipt, the trusted third party data processing system 106, may verify that the token matches the token previously registered with the mobile device 112.

In various embodiments including the above-described alternative embodiments, the entity data processing system 104 may perform some or all of the functions of the trusted third party data processing system 106. For example, the trusted third party data processing system 106 may not exist. In one example, the entity data processing system 104 may generate the message 510 based on information received from the mobile device 112 during a previous registration procedure. In another example, the mobile device 112 may encrypt the response message 530 using the public key of the entity data processing system 104 based on information received from the entity data processing system 104 during a previous registration procedure and send the response message 530 directly to the entity data processing system 104. The entity data processing system 104 may decrypt and authenticate the user based on information received from the mobile device 112 during a previous registration procedure. In another example, the entity data processing system 104 may verify that a token in a received message matches the token previously registered with the mobile device 112.

Figure 6:
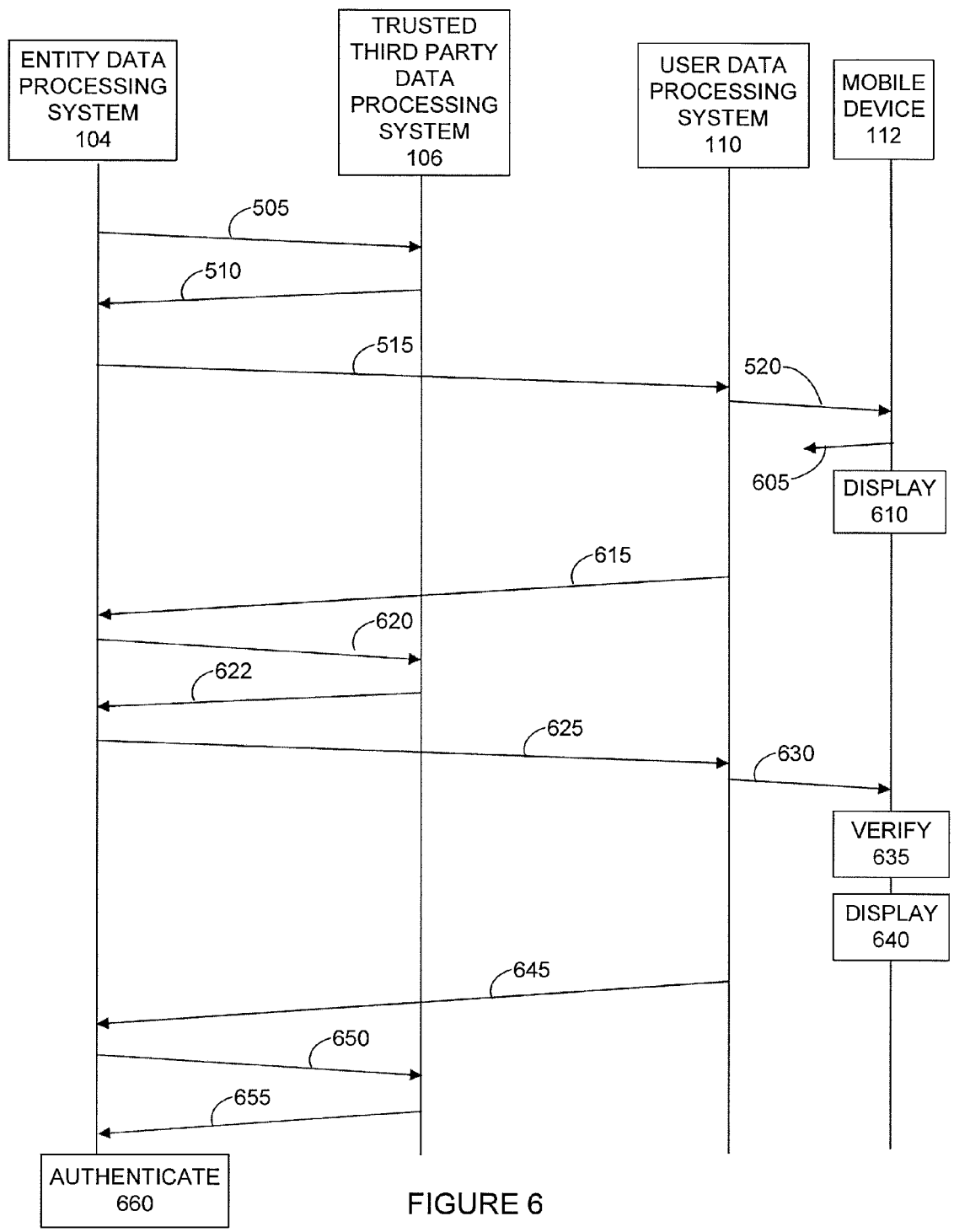
FIG. 6 illustrates a message flow diagram for authenticating a user for a session using an offline mode in accordance with an illustrative embodiment.

FIG. 6 illustrates a message flow diagram for authenticating a user for a session using an offline mode in accordance with an illustrative embodiment. In these illustrative examples, the authentication process is performed when the mobile device 112, after having identified 520 the contents of the message (e.g., scans and decodes the optically-scannable image, captures and decodes the message from the sound played or the data exchanged via NFC), is unable 605 to connect to the trusted third party data processing system 106 or the entity data processing system 104, or if the user requests the offline mode.

The mobile device 112 may identify the session identifier (e.g. the identifier for the entity data processing system 104) from the message 520 to find the user identifier associated with that entity data processing system 104 from a previous registration. If more than one identity is found (e.g., multiple logins), the mobile device 112 may present a selection menu for the user to choose a user identifier from. To initiate the offline mode, the mobile device 112 may display 610 the user identifier on the display of the mobile device 112. The user may then manually enter the user identifier into an interface associated with the session on the user data processing system 110. The user data processing system 110 sends 615 the user identifier to the entity data processing system 104. Upon receiving the user identifier, the entity data processing system 104 identifies the request for the offline mode and sends 620 the user identifier to the trusted third party data processing system 106.

The trusted third party data processing system 106 uses the user identifier to identify the identifier of the mobile device 112 and corresponding public key and generates and sends a second message 622 to the entity data processing system 104. The trusted third party data processing system 106 or the entity data processing system 104 may start a timer for the response from the user to be received. The second message 622 may be encrypted with the public key for mobile device 112 and may include a random unique challenge code, a security level identifier, the identifier for the entity data processing system 104 and a signature for the message using the private key of the trusted third party data processing system 106. The entity data processing system 104 sends the message 625 through an interface associated with the session (e.g., through user data processing system 110) to be provided to the mobile device 112.

The mobile device 112 identifies 630 the contents of the second message 622 (e.g., scans and decodes the optically-scannable image, captures and decodes the message from the sound played or the data exchanged via NFC). For example, the mobile device 112 may verify the signature using the public key of the trusted third party data processing system 106, decrypt the encrypted portion of the message and verify that the mobile device 112 has been registered with the entity data processing system 104 with the identifier. The mobile device 112 may display a request for a user input to verify 635 that the user is an authorized user of the mobile device 112.

The mobile device 112 may then perform a function on the challenge code resulting in a response code. For example, this function may be a mathematical transformation, a cryptographic function, a null function (e.g. the response code is identical to the challenge code), or some other function. The mobile device 112 may display 640 the response code for the user to enter into the interface associated with the session (e.g., using the user data processing system 110). The user data processing system 110 sends 645 the entered response code to the entity data processing system 104. The entity data processing system 104 sends a message 650 including the entered response code to the trusted third party data processing system 106 for comparison with the expected response code to the originally issued challenge code. The trusted third party data processing system 106 may then send a message 655 to the entity data processing system 104 including an assertion that the user is authenticated for the session. The entity data processing system 104 then grants access (e.g. authenticates 660) the user for the session.

In an alternative embodiment, the contents of the message 515 are signed by the entity data processing system 104, and the message 625 is generated by the entity data processing system 104 and signed by the entity data processing system 104. In this embodiment, the mobile device 112 may verify the signatures of the messages 520 and 630 using the public key of the entity data processing system 104 that the mobile device 112 may have stored during a previous registration.

In some embodiments, the entity data processing system 104 may generate the message 622 or otherwise obtain the challenge code from the trusted third party data processing system 106. For example, in some embodiments, the trusted third party data processing system 106 may not exist. In these examples, the entity data processing system 104 may perform the comparison of the entered response code from the message 645 to the expected response to what was in message 622 and approve (or deny) the transaction without input from the trusted third party data processing system 106.

Figure 7:
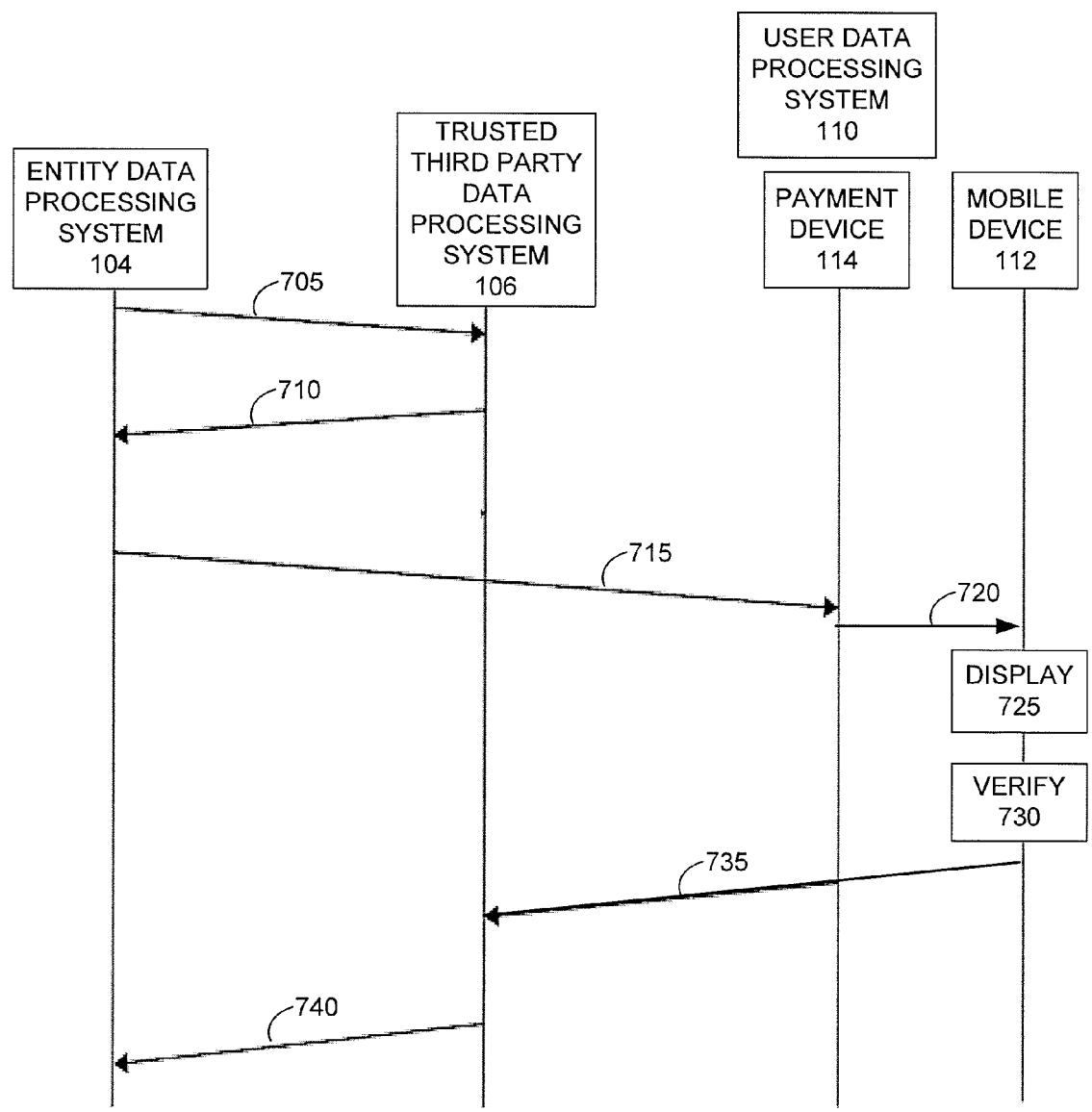
FIG. 7 illustrates a message flow diagram for payment processing in accordance with an illustrative embodiment.

FIG. 7 illustrates a message flow diagram for payment processing in accordance with an illustrative embodiment. The various embodiments of the present disclosure provide services for payment processing of a transaction using the mobile device 112 as a payment facilitator.

When a transaction is at a point of needing payment from a user, the entity data processing system 104 sends a message 705 to the trusted third party data processing system 106. For example, the request for payment may be generated when a user requests to check out at a restaurant, in a retail store or while accessing an online website store; or in another application, the entity data processing system 104 associated with a website requests information about the user to complete an online activity.

The trusted third party data processing system 106 generates and sends a message 710 in response to the entity data processing system 104. The message 710 may include one or more of a security level identifier, an identifier of the entity data processing system 104 (e.g., an identifier for the Website, a URL or a specific code assigned by the trusted third party data processing system 106), an identifier for the session assigned by the trusted third party data processing system 106, a payment amount, payment options, a description identifying the transaction, currency, a request for shipping information and a signature for the message signed by the trusted third party data processing system 106.

The entity data processing system 104 then sends the message 715 to be provided to the mobile device 112. For example, without limitation, contents of the message 715 may be displayed to the user on a website on a user data processing system 110 or a payment device 114 associated with the entity data processing system 104 as an optically-scannable image (e.g., encoded in a QR code, bar code, or other symbols that can be captured by a camera and identified by the mobile device 112), sent using near field communication (NFC) devices associated with payment device 114 or other limited distance point-to-point radio, encoded as sound played by a speaker of the user data processing system 110 or, the payment device 114. In these examples, the payment device 114 may be located in a facility associated with the entity data processing system 104. For example, the payment device 114 may be a point-of-sales terminal that may be in a fixed location or mobile and connected wirelessly. In another example, the contents of the message may be printed (e.g., as an optically-scannable image) on a check or bill.

The mobile device 112 identifies 720 the contents of the message (e.g., scans and decodes the optically-scannable image, captures and decodes the message from the sound played or the data exchanged via NFC). The mobile device 112 may check the signature of the trusted third party data processing system 106 and display 725 information related to the transaction, options for how to complete the transaction, and possibly including a request for the user to confirm the transaction. For example, the mobile device 112 may display a payment amount, a selection of payment accounts (e.g., credit card accounts or bank accounts), information about the merchant (e.g., the entity data processing system 104), the description of the transaction, a field for tip amount or percentage and a request to confirm the payment. In other examples, if it is an online mail order transaction, the mobile device 112 may provide or request that the user confirm or provide a shipping address for items to be delivered.

In one embodiment, the application on the mobile device 112 may automatically identify the information requested from information stored in the mobile device 112. For example, the application may store various payment methods, shipping addresses, email addresses or other personal information. When a request for the information is received, sending the requested information is a matter of a selection and/or confirmation to send the information requested. In one example, the mobile device 112 may automatically calculate a preconfigured tip amount for certain transactions.

In another embodiment, the application on the mobile device 112 may reference information that is stored at the trusted third party data processing system 106 and only display references to the information.

In an alternative embodiment, the mobile device 112 may identify 720 the contents of the message and identify a URL for further communication with the trusted third party data processing system 106, such as over a TLS secure connection. The trusted third party data processing system 106 may proceed to ask for payment confirmation or options over the TLS connection.

When approved, depending on the security level parameter or local configuration in the mobile device 112, the mobile device 112 may display 730 a request for a user input to verify that the user is an authorized user of the mobile device 112.

The mobile device 112 sends a response message 735 to the trusted third party data processing system 106. The response message 735 is encrypted with the public key for the trusted third party data processing system 106 and may include the identifier for the entity data processing system 104, the identifier for the session, the requested information (e.g., payment information, amount, payment account, tip, shipping address selection, personal information), references to the information stored at the trusted third party data processing system 106, the identifier for the mobile device 112 and a signature for the message signed by the mobile device 112.

In an alternative embodiment, the response message 735 is part of an established TLS session between the mobile device 112 and the trusted third party data processing system 106, and the information from the mobile device 112 may include a token (e.g., a cookie), the session identifier and payment information.

In various embodiments of the present disclosure, messages received by the mobile device 112 and messages sent by the mobile device 112 may travel via different communication paths. For example, the communication path for messages 710, 715, and 720 may include a computer network and some form of limited distance non-traditional communication path, (e.g., an optical scan, NFC, sound waves). The response message 735 is sent over a different communications path including a wireless network associated with the mobile device 112 (e.g., WiFi, cellular data network).

The trusted third party data processing system 106 determines whether the signature was created with the public key associated with the identifier of the mobile device 112, and identifies the corresponding session based on the session identifier. The trusted third party data processing system 106 may determine the eligibility of the user's selected payment method, process the transaction using the information provided in the message 735, and send a message 740 notifying the entity data processing system 104 of the processed payment transaction.

In an alternative embodiment, the trusted third party data processing system 106 may determine that a token (e.g., a cookie) received from the mobile device matches the token associated with the mobile device 112, determine the eligibility of the user's selected payment method, process the transaction based on the information provided in the message 735 and send a message 740 notifying the entity data processing system 104 of the processed payment transaction. The entity data processing system 104 may, upon receipt of the message 740, proceed to complete the transaction (e.g. print out a receipt, notify retail personnel that payment was received, in the case of mail order proceed to a next step in the ordering process of packing and shipping the product, etc.), and may in real time send a message (e.g., receipt) back to the trusted third party data processing system 106 for the trusted third party data processing system 106 to send on to the mobile device 112 that the transaction was successful or that the transaction will be processed later.

In other illustrative examples, the entity data processing system 104 may request certain information from the user (e.g. certain personal information, a driver's license number, social security number, shoe size, etc.). In these examples, the trusted third party data processing system 106 may not process a payment but may process this information for the entity data processing system 104 based on selections and input from the user on the mobile device 112.

In various embodiments, the trusted third party data processing system 106 may not exist. In these embodiments, message 710 is generated by the entity data processing system 104 and may be signed by the entity data processing system 104. The mobile device 112 may contact, the entity data processing system 104 over a TLS connection and deliver payment information (e.g. a credit card number, bank account number, etc.) or other information directly. The entity data processing system 104 will then complete the payment transaction using the received information from the mobile device 112.

In various embodiments of the present disclosure, the mobile device 112 may use a location sensor (GPS) to determine the geographical location of the mobile device 112. This information may be used to further determine the validity of the registration, confirmation, authentication, payment, or other function being performed. This determination may be performed by the mobile device 112. This location information may also be communicated to the trusted third party data processing system 106 or the entity data processing system 104, and the determination may be performed there. For example, an entity data processing system 104 could choose to only allow users to authenticate with a website if they are located within a certain region of the world. In another example, a payment processing the trusted third party data processing system 106 may choose to not allow payments from users located in a certain country.

Figure 8:
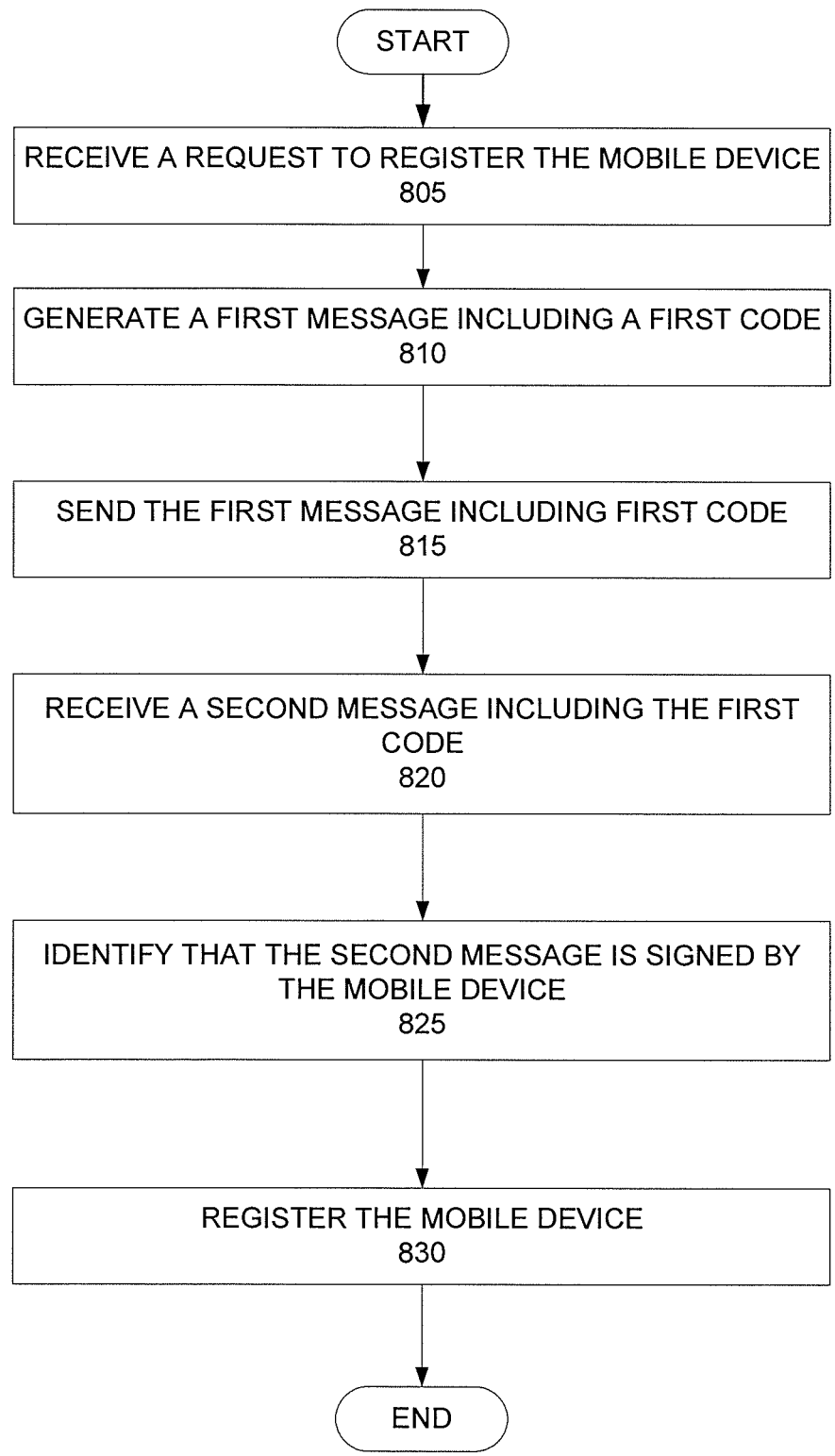
FIG. 8 illustrates a flowchart for a process for registering a mobile device in accordance with an illustrative embodiment.

FIG. 8 illustrates a flowchart of a process for registering a mobile device in accordance with an illustrative embodiment. This process can be performed, for example, by one or more data processing systems configured to perform acts described below. The process can be implemented by executable instructions stored in a non-transitory computer-readable medium that cause one or more data processing systems to perform such a process. For example, the process illustrated in FIG. 8 may be implemented by the entity data processing system 104 and/or the trusted third party data processing system 106 in FIG. 1.

The process begins by receiving a request to register the mobile device (block 805). In block 805, the request may be received from a user of a mobile device via the mobile device or a user data processing system. The process then generates a first message including a first code (block 810).

Thereafter, the process sends the first message including first code (block 815). In block 815, the first message may be sent for display in a user interface associated with a website of the entity. In other examples, the message may be displayed on a user interface in clear text, encoded into an optically-scannable image, sent using NFC link, or transmitted as audio. The process then receives a second message including the first code (block 820).

Thereafter, the process identifies that the second message is signed by the mobile device (block 825). In block 825, the process may send a second code to the mobile device to increase the security of the registration of the mobile device. For example, the process may encrypt the second code with the public key of the mobile device and send the second code in a message to the mobile device for decryption and return. Upon return of the second code, the process has verified the mobile device based on the ability of the mobile device to decrypt the second code. The process then registers the mobile device (block 830), with the process terminating thereafter. In block 830, the mobile device is registered for use with the future session with the entity based on at least a portion of the second message being encrypted using the private key associated with the mobile device.

Figure 9:
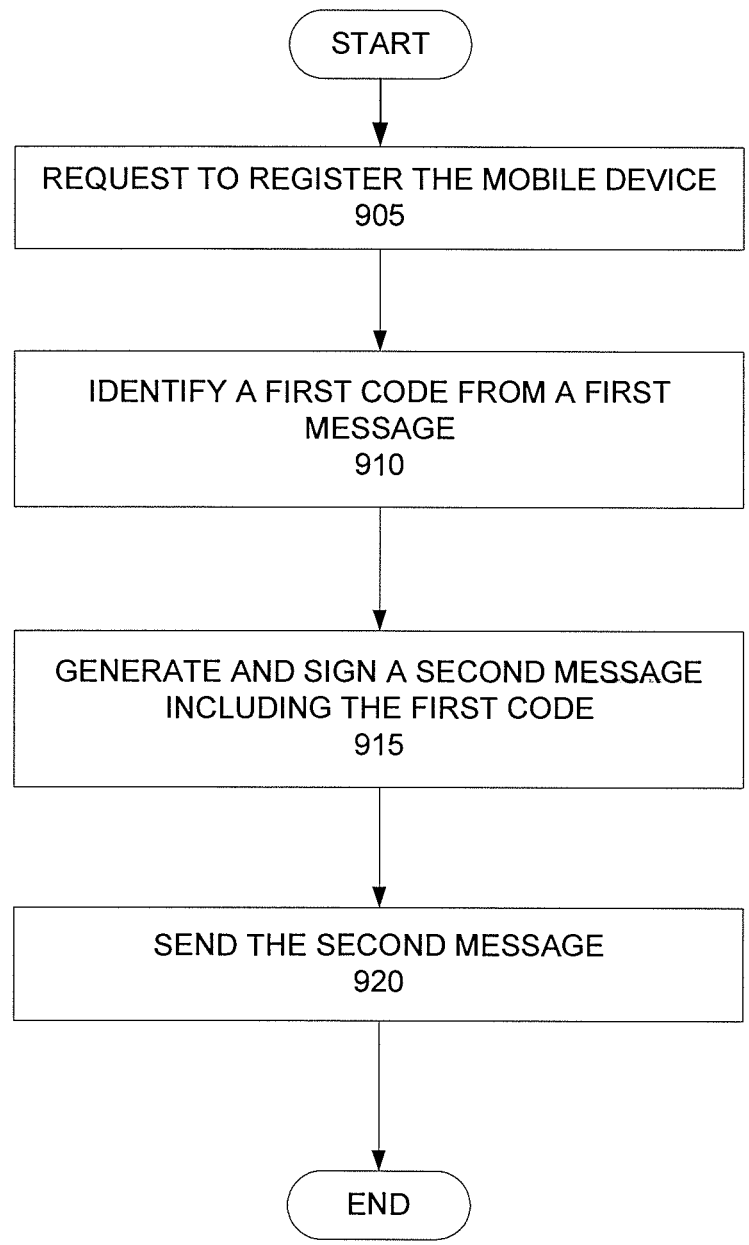
FIG. 9 illustrates a flowchart for a process for registering a mobile device performed at a mobile device in accordance with an illustrative embodiment.

FIG. 9 illustrates a flowchart of a process for registering a mobile device performed at a mobile device in accordance with an illustrative embodiment. This process can be performed, for example, by one or more data processing systems configured to perform acts described below. The process can be implemented by executable instructions stored in a non-transitory computer-readable medium that cause one or more data processing systems to perform such a process. For example, the process illustrated in FIG. 9 may be implemented by the mobile device 112 in FIG. 1.

The process begins by requesting to register the mobile device (block 905). In block 905, the request may be made by a user of a mobile device via the mobile device or a user data processing system. The process then identifies a first code from a first message (block 910). In block 910, the mobile device may identify the first message including the first code from an optically-scannable image, using a near field communications (NFC) link, using a limited distance point-to-point radio or from audio received by the mobile device.

Thereafter, the process generates and signs a second message including the first code (block 915). The process then sends the second message (block 920), with the process terminating thereafter. In block 920, the mobile device may send the second message to one of the entity and a third party. The mobile device sends the message so that one of the entity and a third party will register the mobile device for use with the future session with the entity. The process may also receive a second code encrypted in a message. For example, the second code may be encrypted with the public key of the mobile device and sent to the mobile device for decryption and return. Upon receipt of the message, the mobile device decrypts the second code and the second code is sent. The registering entity can then further verify the mobile device based on the ability of the mobile device to decrypt the second code.

Figure 10:
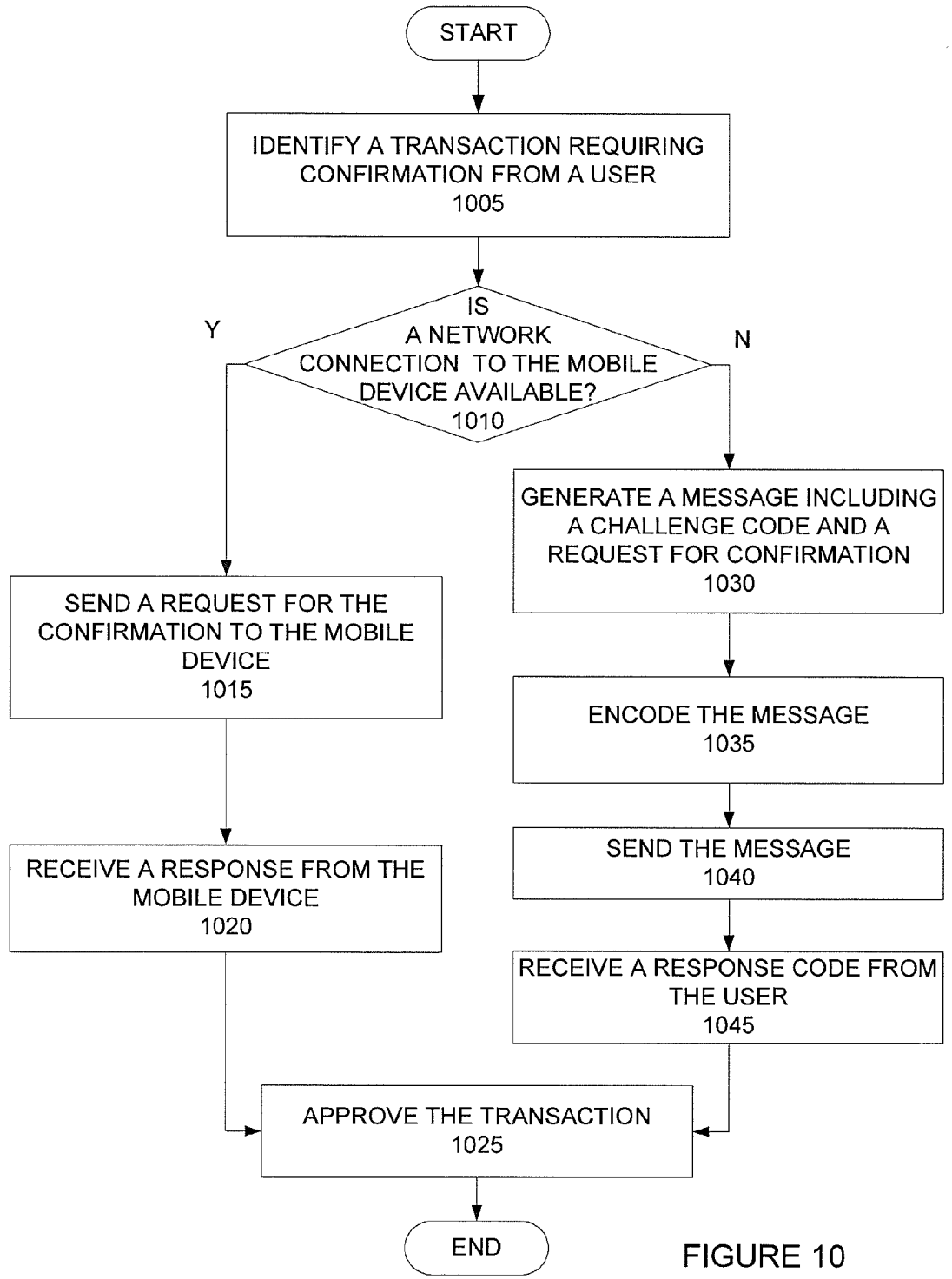
FIG. 10 illustrates a flowchart of a process for confirming a transaction based on a mobile device in accordance with an illustrative embodiment.

FIG. 10 illustrates a flowchart of a process for confirming a transaction based on a mobile device in accordance with an illustrative embodiment. This process can be performed, for example, by one or more data processing systems configured to perform acts described below. The process can be implemented by executable instructions stored in a non-transitory computer-readable medium that cause one or more data processing systems to perform such a process. For example, the process illustrated in FIG. 10 may be implemented by the entity data processing system 104 and/or the trusted third party data processing system 106 in FIG. 1.

The process begins by identifying a transaction requiring confirmation from a user (block 1005). For example, the transaction may be a type of transaction that a user or an entity has requested to get approval of a user from before processing. The process then determines whether a network connection to the mobile device is available (block 1010). In block 1010, the process identifies a mobile device associated with the user that the user has selected to be notified on when such a transaction requiring confirmation is identified. In block 1010, the process identifies whether the confirmation procedure will be completed with direct communication to the mobile device (e.g., in an online or offline mode). For example, the process may ping the mobile device to determine whether the mobile device has network connectivity. In other examples, the process may identify that the user of the mobile device has preselected the offline mode.

If the process determines that a network connection to the mobile device is available, the process sends a request for the confirmation to the mobile device (block 1015). Thereafter, the process receives a response from the mobile device (block 1020). In block 1020, the response may include an approval or denial of the transaction requiring confirmation.

The process then approves the transaction (block 1025), with the process terminating thereafter. In block 1025, the process approves the transaction if the response includes the user's approval. For example, the process sends approval for the transaction to be processed. If the message includes a user denial of the transaction, the process will not approve the transaction.

Returning to block 1010, if the process determines that a network connection to the mobile device is not available, the process generates a message including a challenge code and a request for confirmation (block 1030). Thereafter, the process encodes the message (block 1035). In block 1035, the message is encoded into one of an optically-scannable image and an audio message. In these illustrative embodiments, the optically-scannable image is intended for identification or decoding by a machine (e.g., the mobile device 112) as opposed to being encoded in a format that is intended for decoding by a human. Also, in these illustrative embodiments, the audio message that the message is encoded is intended for identification or decoding by a machine (e.g., the mobile device 112) as opposed to being encoded in an audio format that is intended for decoding by a human. For example, the audio message may be encoded as pulses or tones that can be decoded into the contents rather than encoded as audible words representing the contents of the message.

The process then sends the message (block 1040). In block 1040, the process sends the message for display or other presentation on a user interface (e.g., a website). The process may encrypt the message, including the challenge code, with a public key associated with the mobile device before sending the message.

Thereafter, the process receives a response code from the user (block 1045). In block 1045, the user may enter the response code into the website for delivery to the entity requesting the confirmation. The response code is a function of the challenge code. The process then proceeds to block 1025 and approves the transaction.

Figure 11:
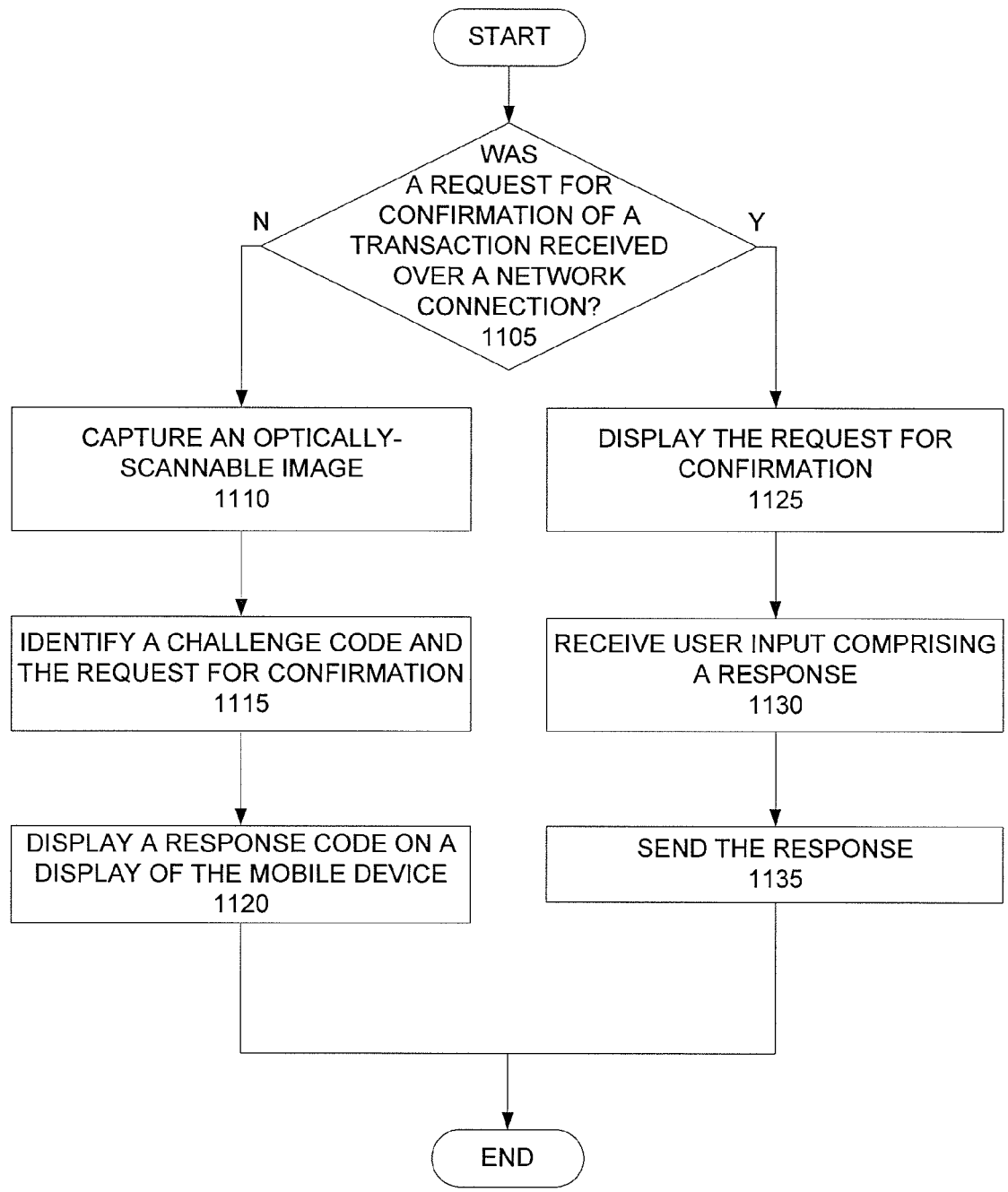
FIG. 11 illustrates a flowchart of a process for confirming transactions using a mobile device in accordance with an illustrative embodiment.

FIG. 11 illustrates a flowchart of a process for confirming transactions using a mobile device in accordance with an illustrative embodiment. This process can be performed, for example, by one or more data processing systems configured to perform acts described below. The process can be implemented by executable instructions stored in a non-transitory computer-readable medium that cause one or more data processing systems to perform such a process. For example, the process illustrated in FIG. 11 may be implemented by the mobile device 112 in FIG. 1.

The process begins by determining whether a request for confirmation of a transaction was received over a network connection (block 1105). In block 1105, when the request is received over the network connection, the confirmation procedure proceeds with an online mode of confirmation. In other examples, the mobile device may not have network connectivity, or a user may have preselected to not receive confirmation requests at the mobile device.

If the process determines that a request for confirmation of a transaction was not received over a network connection, the process captures an optically-scannable image (block 1110). In block 1110, the process captures the image displayed on a user interface of a website.

The process then identifies a challenge code and the request for confirmation (block 1115). In block 1115, the process identifies the challenge code from the captured image. Thereafter, the process displays a response code on a display of the mobile device (block 1120), with the process terminating thereafter. In block 1120, the process displays the response code for entry by the user into a user interface associated with the website. The response code is a function of the challenge code. For example, the mobile device may apply a function to the challenge code to generate the response code for display to the user.

Returning to block 1105, if the process determines that a request for confirmation of a transaction was received over a network connection, the process displays the request for confirmation (block 1125). In block 1125, the request for confirmation is displayed on a screen of the mobile device. The process then receives user input comprising a response (block 1130). In block 1130, for example, the user may select to approve or deny the transaction via an input into the mobile device. Thereafter, the process sends the response (block 1135), with the process terminating thereafter. In block 1135, the process sends the response of the user to the entity requesting the confirmation.

Figure 12:
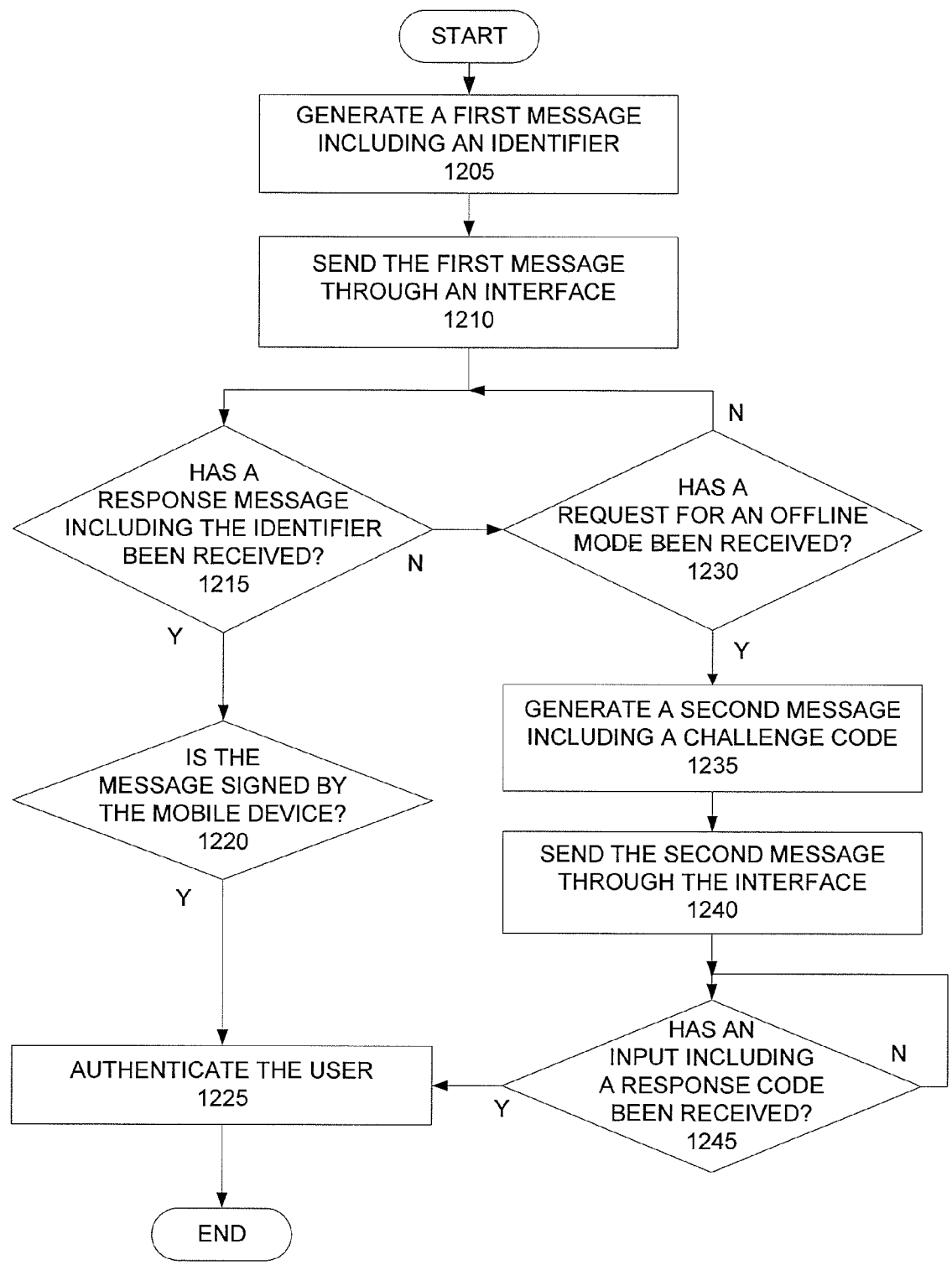
FIG. 12 illustrates a flowchart for a process for authenticating a user for a session in accordance with an illustrative embodiment.

FIG. 12 illustrates a flowchart of a process for authenticating a user for a session in accordance with an illustrative embodiment. This process can be performed, for example, by one or more data processing systems configured to perform acts described below. The process can be implemented by executable instructions stored in a non-transitory computer-readable medium that cause one or more data processing systems to perform such a process. For example, the process illustrated in FIG. 12 may be implemented by the entity data processing system 104 and/or the trusted third party data processing system 106 in FIG. 1.

The process begins by generating a first message including an identifier (block 1205). In block 1205, the identifier is an identifier for the session for which the user is requesting to be authenticated. The process then sends the first message through an interface (block 1210). In block 1210, the interface may be a website associated with the entity, an electronic lock or a computer system. The process may encode the first message into an optically-scannable image to be presented on a login web page of the website. The process may send the first message for delivery to the mobile device using one of a near field communications (NFC) link and a limited distance point-to-point radio. The process may send the first message for transmission as audio.

Thereafter, the process determines whether a response message including the identifier has been received (block 1215). If the process determines that the response message including the identifier has been received, the process determines whether the message is signed by the mobile device (block 1220). If the process determines that the message is signed by the mobile device, the process authenticates the user (block 1225), with the process terminating thereafter.

Returning to block 1215, if the process determines that the response message including the identifier has not been received, the process determines whether a request for an offline mode has been received (block 1230). In block 1230, the offline mode may be requested by receiving a user identifier entered through an interface associated with the session. The offline mode may be selected because of lack of connectivity. If the process determines that request for an offline mode has not been received, the process returns to block 1215 and continues to wait for the response message.

If, however, the process determines that a request for an offline mode has been received, the process generates a second message including a challenge code (block 1235). In block 1235, the second message is encrypted using a key associated with the mobile device. The process then sends the second message through the interface (block 1240). In block 1240, the message may be sent through the same interface as in block 1210. Thereafter, the process determines whether an input including a response code has been received (block 1245). If the process determines that an input including the response code has been received, the process proceeds to block 1225 and authenticates the user, with the process terminating thereafter. The response code is a function of the challenge code.

Figure 13:
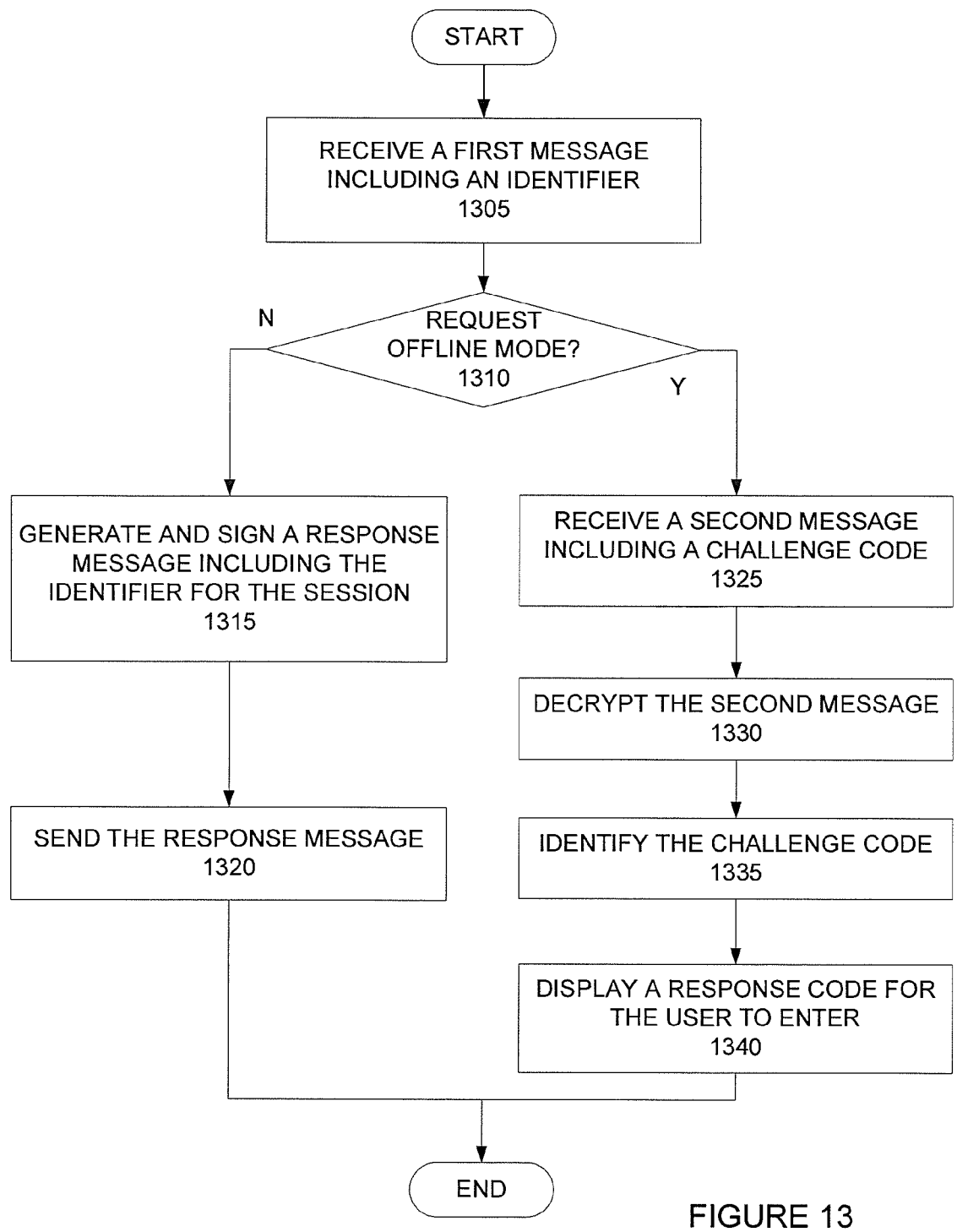
FIG. 13 illustrates a flowchart for a process for authenticating a user for a session performed at a mobile device in accordance with an illustrative embodiment.

FIG. 13 illustrates a flowchart of a process for authenticating a user for a session performed at a mobile device in accordance with an illustrative embodiment. This process can be performed, for example, by one or more data processing systems configured to perform acts described below. The process can be implemented by executable instructions stored in a non-transitory computer-readable medium that cause one or more data processing systems to perform such a process. For example, the process illustrated in FIG. 13 may be implemented by the mobile device 112 in FIG. 1.

The process begins by receiving a first message including an identifier (block 1305). In block 1305, the mobile device receives the identifier through an interface associated with a session. For example, the mobile device may identify the first message from an optically-scannable image presented on a login web page of a website. The mobile device may receive the first message using one of a near field communications (NFC) link or a limited distance point-to-point radio. The mobile device may identify the first message from audio received by the mobile device.

The process then determines whether to request an offline mode (block 1310). In block 1310, the mobile device may lack connectivity to a network or a user may choose to request the offline mode even if network connectivity is available. If the offline mode is not requested, the process generates and signs a response message including the identifier for the session (block 1315). In block 1315, the response message may include a user identifier and be encrypted using a public key associated with one of the entity and the third party. The mobile device may request an input from a user of the mobile device to verify that the user is an authorized user of the mobile device. For example, the input may be at least one of a personal identification number, a password, a biometric input, a predefined gesture on a touch screen of the mobile device and a predefined pattern of movement of the mobile device.

Thereafter, the process sends the response message (block 1320), with the process terminating thereafter. In block 1320, the mobile device may send the response message to one of the entity and the third party to request authentication of the user for the session.

Returning to block 1310, if the offline mode is requested, the process receives a second message including a challenge code (block 1325). In block 1325, the second message may be received and identified through the interface associated with the session. The process then decrypts the second message (block 1330). In block 1330, the second message may be encrypted using a key associated with a mobile device. Thereafter, the process identifies the challenge code from the decrypted message (block 1335). The process then displays a response code for the user to enter (block 1340), with the process terminating thereafter. In block 1340, the mobile device may display the response code on a display for the user to enter into the interface associated with the session. The response code is a function of the challenge code. For example, the mobile device may apply a function to the challenge code to generate the response code for display to the user.

Figure 14:
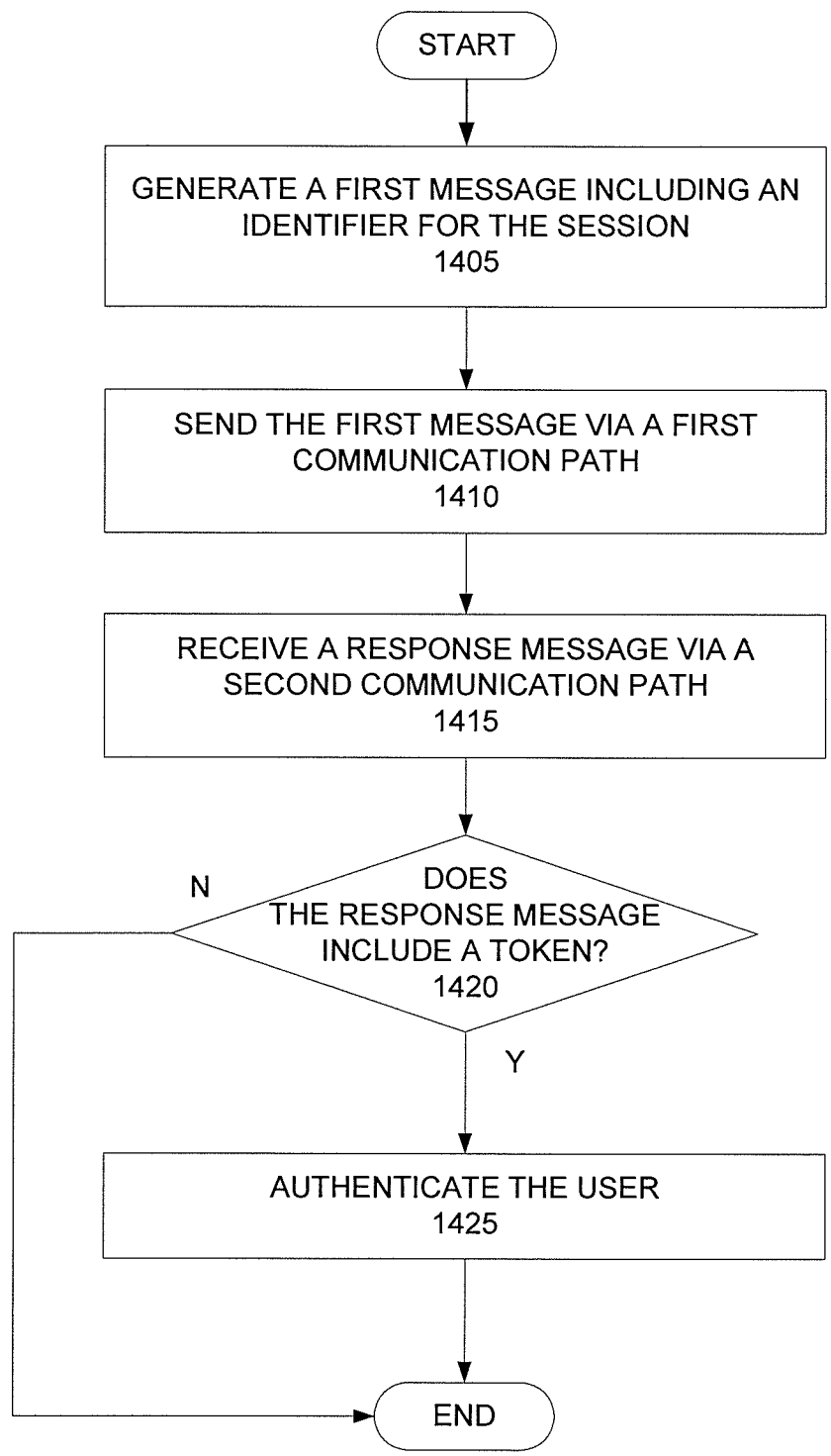
FIG. 14 illustrates a flowchart for a process for authenticating a user for a session using a token in accordance with an illustrative embodiment.

FIG. 14 illustrates a flowchart of a process for authenticating a user for a session using a token in accordance with an illustrative embodiment. This process can be performed, for example, by one or more data processing systems configured to perform acts described below. The process can be implemented by executable instructions stored in a non-transitory computer-readable medium that cause one or more data processing systems to perform such a process. For example, the process illustrated in FIG. 14 may be implemented by the entity data processing system 104 and/or the trusted third party data processing system 106 in FIG. 1.

The process begins by generating a first message including an identifier for the session (block 1405). The process then sends the first message via a first communication path (block 1410). In block 1410, the first communication path may include an optical scan.

Thereafter, the process receives a response message via a second communication path (block 1415). In block 1415, the second communication path is different from the first communication path; for example, the second communication path may not include the optical scan. The response message is received from a mobile device associated with the user and includes the identifier for the session. The response message may also include a token associated with the mobile device. For example, the token may have been received by the mobile device from a registration of the mobile device using a website. In this manner, the mobile device may be used to authenticate the user using a token from a web registration process without the need for a special application.

The process then determines whether the response message includes a token (block 1420). If the process determines that the response message includes the token, the process authenticates the user (block 1425), with the process terminating thereafter. If the process determines that the response message does not include the token, the process may end without authenticating the user. The process may also generate and send a new message including the identifier to retry the authentication procedure described in FIG. 14.

Figure 15:
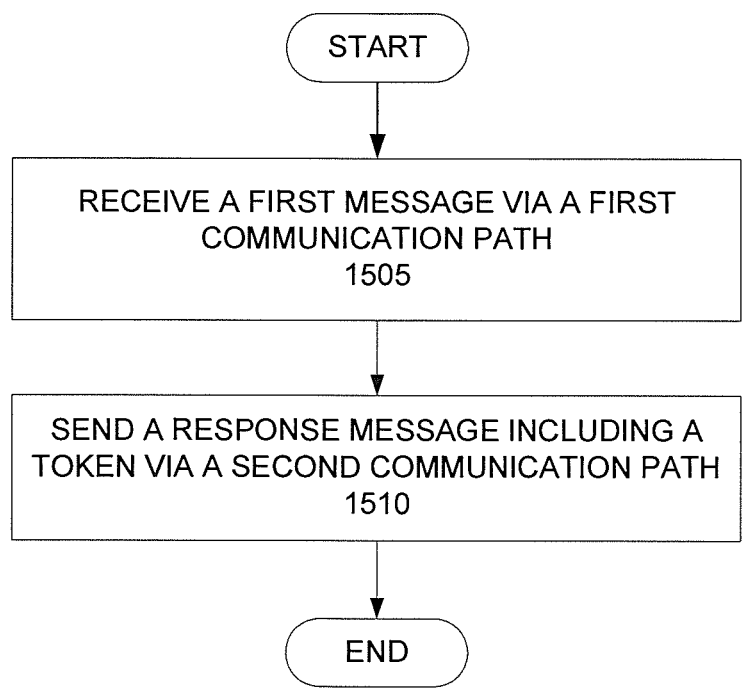
FIG. 15 illustrates a flowchart for a process for authenticating a user for a session using a token performed at a mobile device in accordance with an illustrative embodiment.

FIG. 15 illustrates a flowchart of a process for authenticating a user for a session performed at a mobile device in accordance with an illustrative embodiment. This process can be performed, for example, by one or more data processing systems configured to perform acts described below. The process can be implemented by executable instructions stored in a non-transitory computer-readable medium that cause one or more data processing systems to perform such a process. For example, the process illustrated in FIG. 15 may be implemented by the mobile device 112 in FIG. 1.

The process begins by receiving a first message via a first communication path (block 1505). In block 1505, the first message is received at a mobile device associated with the user. The first message may include an identifier for the session. The first communication path may include an optical scan.

The process then sends a response message including a token via a second communication path (block 1510), with the process terminating thereafter. In block 1510, the second communication path is different from the first communication path; for example, the second communication path may not include the optical scan. The response message may also include the identifier for the session with the token associated with the mobile device. For example, the token may have been received by the mobile device from a registration of the mobile device using a website. In this manner, the mobile device may be used to authenticate the user using a token from a web registration process without the need for a special application. The response message is sent with the token for authentication of the user based on the response message including the token associated with the mobile device.

Figure 16:
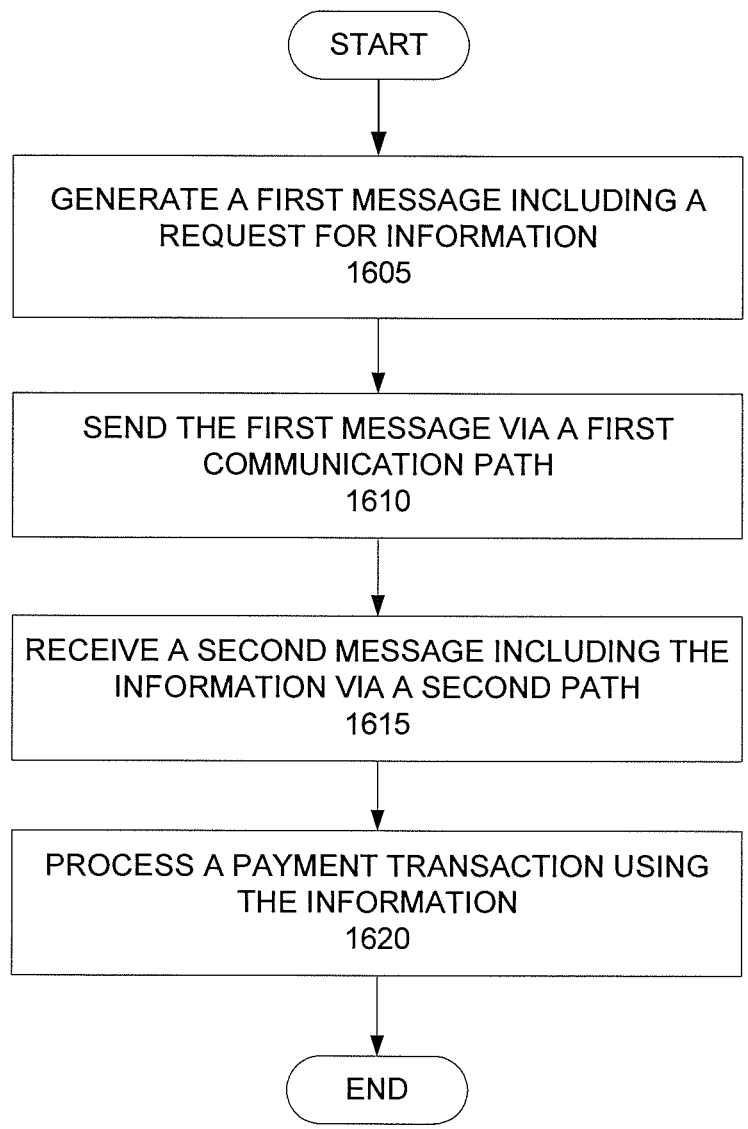
FIG. 16 illustrates a flowchart for a process for obtaining information for a payment transaction in accordance with an illustrative embodiment.

FIG. 16 illustrates a flowchart of a process for obtaining information for a payment transaction in accordance with an illustrative embodiment. This process can be performed, for example, by one or more data processing systems configured to perform acts described below. The process can be implemented by executable instructions stored in a non-transitory computer-readable medium that cause one or more data processing systems to perform such a process. For example, the process illustrated in FIG. 16 may be implemented by the entity data processing system 104 and/or the trusted third party data processing system 106 in FIG. 1.

The process begins by generating a first message including a request for information (block 1605). In block 1605, the first message may include a session identifier and a request for information. The process then sends the first message via a first communication path (block 1610). In block 1610, a portion of the first communication path can include encoding the first message into an optically-scannable image, sending the first message using one of a near field communications (NFC) link or a limited distance point-to-point radio and transmitting the first message as audio.

Thereafter, the process receives a second message including the information via a second path (block 1615). In block 1615, the second message may include the identifier and the requested information. The second communication path is different than the first communication path. For example, the second communication path may be a network link using a wireless network connection of the mobile device. The process then processes the payment transaction using the information (block 1620), with the process terminating thereafter.

Figure 17:
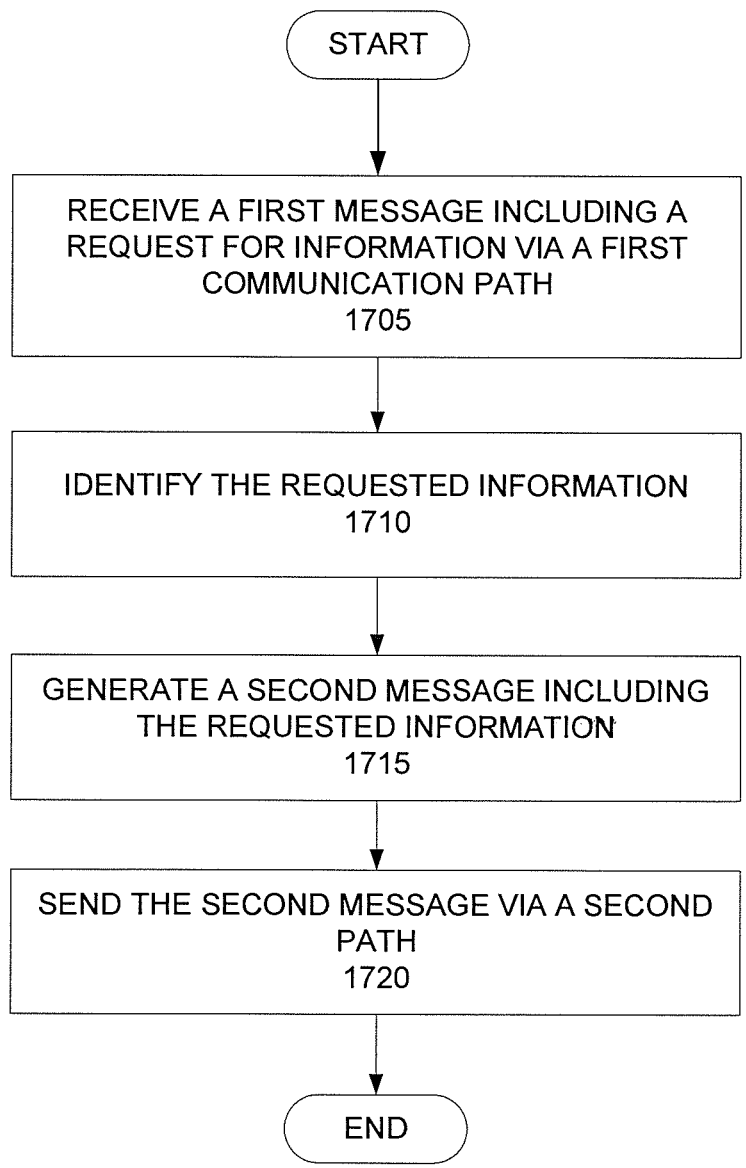
FIG. 17 illustrates a flowchart for a process for obtaining information for a payment transaction performed at a mobile device in accordance with an illustrative embodiment.

FIG. 17 illustrates a flowchart of a process for sending information for a payment transaction performed at a mobile device in accordance with an illustrative embodiment. This process can be performed, for example, by one or more data processing systems configured to perform acts described below. The process can be implemented by executable instructions stored in a non-transitory computer-readable medium that cause one or more data processing systems to perform such a process. For example, the process illustrated in FIG. 17 may be implemented by the mobile device 112 in FIG. 1.

The process begins by receiving a first message including a request for information via a first communication path (block 1705). In block 1705, the first message may include an identifier for the session and a request for information. The first communication path can include identifying the first message an optically-scannable image presented on a web page of a website associated with the payment transaction and identifying the first message from the optically-scannable image presented a display device of an entity associated with the payment transaction. The first communication path may also include receiving the first message using one of a near field communications (NFC) link and a limited distance point-to-point radio and identifying the first message from audio received by the mobile device.

The process then identifies the requested information (block 1710). In block 1710, the mobile device may automatically identify the information and display a request for confirmation or selection of the information to be sent. In other examples, the mobile device may request an input including the information.

Thereafter, the process generates a second message including the requested information (block 1715). In block 1715, the mobile device may request, before sending the second message, an input from a user of the mobile device to verify that the user is an authorized user of the mobile device. The input may be at least one of a personal identification number, a password, a biometric input, a predefined gesture on a touch screen of the mobile device and a predefined pattern of movement of the mobile device.

The process then sends the second message via a second path (block 1720), with the process terminating thereafter. In block 1720, the mobile device sends the second message to one of an entity associated with the payment transaction and a third party. The second communication path is different from the first communication path. For example, the second communication path may be a network link using a wireless network connection of the mobile device.

The flowchart and block diagrams in the figures illustrate the architecture, functionality and operation of possible implementations of systems, methods and computer program products according to various illustrative embodiments. In this regard, each block in the flowchart or block diagrams may represent a module, segment, function and/or a portion of an operation or step. For example, one or more of the blocks may be implemented as program code, in hardware or a combination of the program code and hardware. When implemented in hardware, the hardware may, for example, take the form of integrated circuits that are manufactured or configured to perform one or more operations in the flowcharts or block diagrams.

In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Figure 18:
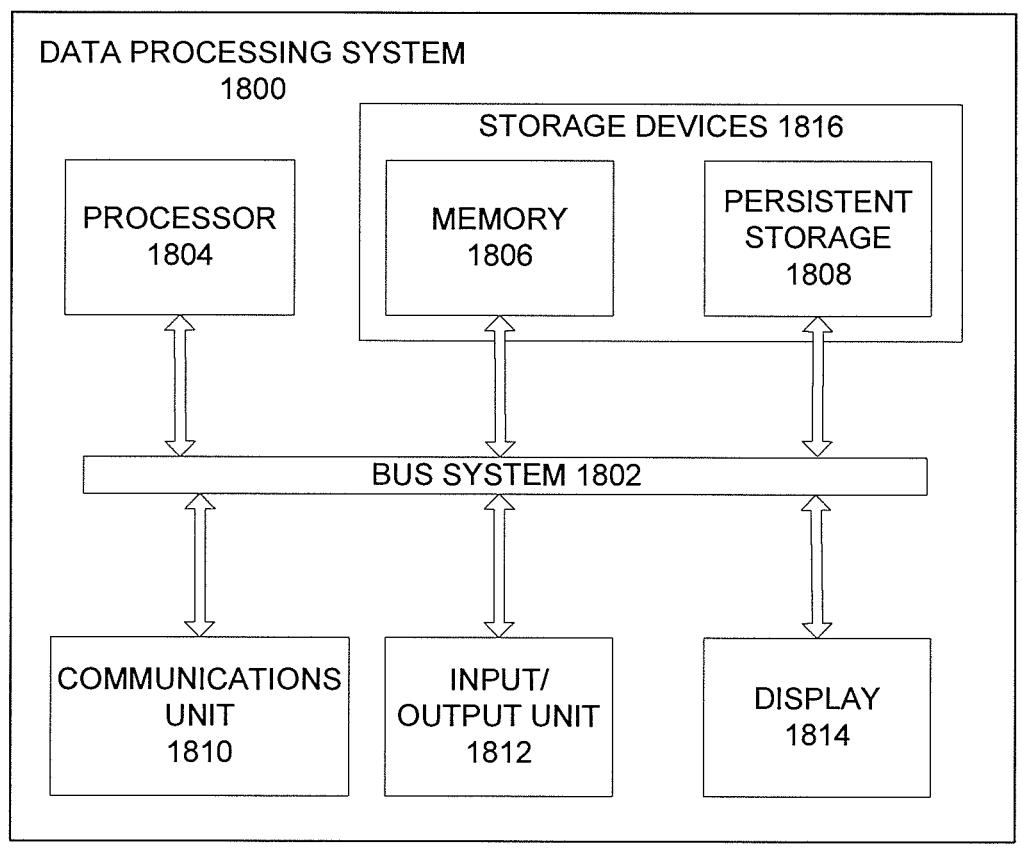
FIG. 18 illustrates a block diagram of a data processing system in accordance with an illustrative embodiment.

FIG. 18 illustrates an example data processing system 1800 in accordance with this disclosure. In this example, the data processing system 1800 includes a bus system 1802, which provides communications between a processor 1804, a memory 1806, a persistent storage 1808, a communications unit 1810, an input/output (I/O) unit 1812, and a display 1814. In these illustrative examples, the data processing system 1800 is an example of one implementation of the trusted third party data processing system 106, the entity data processing system 104, the notification data processing system 108, the user data processing system 110, the mobile device 112 and the payment device 114 in FIG. 1.

The processor 1804 processes instructions for software that may be loaded into the memory 1806. The processor 1804 may be a number of processors, a multi-processor core or some other type of processor, depending on the particular implementation. Further, the processor 1804 may be implemented using a number of heterogeneous processor systems in which a main processor is present with secondary processors on a single chip. As another illustrative example, the processor 1804 may be a symmetric multi-processor system containing multiple processors of the same type.

The memory 1806 and the persistent storage 1808 are examples of storage devices 1816. A storage device is any piece of hardware that is capable of storing information, such as, for example, without limitation, data, program code in functional form and/or other suitable information either on a temporary basis and/or a permanent basis. The memory 1806, in these examples, may be, for example, a random access memory or any other suitable volatile or non-volatile storage device. For example, the persistent storage 1808 may contain one or more components or devices. For example, the persistent storage 1808 may be a hard drive, a flash memory, an optical disk, a rewritable magnetic tape or some combination of the above. The media used by the persistent storage 1808 also may be removable. For example, a removable hard drive may be used for the persistent storage 1808.

The communications unit 1810 provides for communications with other data processing systems or devices. In these examples, the communications unit 1810 is a network interface card. The communications unit 1810 may provide communications through the use of either or both physical and wireless communications links. The communications unit 1810 may also include a NFC transceiver for enabling NFC. The communications unit 1810 may also include a radio frequency (RF) transceiver enabling wireless network communication. The communications unit 1810 may also include a GPS transceiver enabling positional location information.

The input/output unit 1812 allows for input and output of data with other devices that may be connected to the data processing system 1800. For example, the input/output unit 1812 may provide a connection for user input through a keyboard, a mouse and/or some other suitable input device. Further, the input/output unit 1812 may send output to a printer. The input/output unit 1812 may also include or be connected to a camera, microphone, speaker, accelerometer and/or proximity sensor. The data processing system 1800 may utilize inputs and outputs from camera, microphone, speaker, accelerometer and/or proximity sensors in accordance with various communication and data transfer principles of the present disclosure. The display 1814 provides a mechanism to display information to a user. For example, the display 1814 may be a touch screen.

Program code for an operating system, applications, or other programs may be located in the storage devices 1816, which are in communication with the processor 1804 through the bus system 1802. In some embodiments, the program code is in a functional form on the persistent storage 1808. These instructions may be loaded into the memory 1806 for processing by the processor 1804. The processes of the different embodiments may be performed by the processor 1804 using computer implemented instructions, which may be located in the memory 1806. For example, the processor 1804 may perform processes for one or more of the modules and/or devices described above.

In some embodiments, various functions described above are implemented or supported by a computer program product that is formed from computer readable program code and that is embodied in a computer readable medium. Program code for the computer program product may be located in a functional form on a computer readable storage device that is selectively removable and may be loaded onto or transferred to the data processing system 1800 for processing by the processor 1804. In some illustrative embodiments, the program code may be downloaded over a network to the persistent storage 1808 from another device or data processing system for use within the data processing system 1800. For instance, program code stored in a computer readable storage medium in a server data processing system may be downloaded over a network from the server to the data processing system 1800. The data processing system providing program code may be a server computer, a client computer, or some other device capable of storing and transmitting program code.

As will be appreciated by one skilled in the art, aspects of the present disclosure may take the faun of a computer program embodied in one or more computer readable storage medium(s) having program code embodied thereon. A computer readable storage medium may be, for example, without limitation, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device or any suitable combination of the foregoing. The program code may also be loaded for execution by a processor to provide processes for implementing the functions or operations described in the present disclosure.

Embodiments of the present disclosure provide authentication for various transaction confirmations, access sessions and information exchanges utilizing a mobile device of a user. Embodiments of the present disclosure utilize registration processes to allow a mobile device of a user to act as an authentication token for various situations. Embodiments of the present disclosure provide security and simplicity in various user sessions Embodiments of the present disclosure reduce the requirement for users to remember passwords, user identifiers and other personal information while maintaining and/or increasing security in user sessions.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with or the like. The phrase "at least one of", when used with a list of items, means that different combinations of one or more of the listed items may be used, and only one item in the list may be needed. For example, "at least one of item A, item B, and item C" may include, without limitation, item A or item A and item B.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace or to enable others of ordinary skill in the art to understand the embodiments disclosed herein.

What is claimed is:

1. A non-transitory computer-readable medium embodying a computer program for registering a mobile device as being associated with a user, the computer program comprising computer-readable program code for:

establishing, by a data processing system associated with an entity, a current session with the user via a data processing system associated with the user based at least in part on an account the user has or is creating with the entity;

receiving, by the data processing system associated with the entity, a request to register the mobile device as being associated with the user to enable use of the mobile device for a future action associated with the account, the mobile device not previously registered with the entity as being associated with the user;

generating, by the data processing system associated with the entity, a first message including a first registration identifier in response to receiving the request to register the mobile device as being associated with the user to enable use of the mobile device for the future action associated with the account;

sending, by the data processing system associated with the entity, the first message including the first registration identifier to the data processing system associated with the user via a first communication path associated with the current session between the user and the entity;

receiving, by the data processing system associated with the entity, a second message from the mobile device via a second communication path including a wireless communication link, the received second message including a second registration identifier;

associating, by the data processing system associated with the entity, the mobile device with the user based on the second registration identifier being identical to at least one of the first registration identifier and a function of the first registration identifier; and storing, by the data processing system associated with the entity, a public key associated with the mobile device for use of the mobile device with the future action associated with the account based on the associating of the mobile device with the user, the public key received from the mobile device in the second message or another message.

2. The computer-readable medium of claim 1, the computer program further comprising computer-readable program code for:

sending a third message including a challenge code in response to receiving the second message;

wherein the computer-readable program code for associating the mobile device with the user comprises computer-readable program code for verifying registration of the public key associated with the mobile device in response to receiving a fourth message including a response code that is identical to at least one of the challenge code and a function of the challenge code.

3. The computer-readable medium of claim 1, the computer program further comprising computer-readable program code for:

sending a third message, wherein the third message at least one of:
includes a security certificate for the entity;
is encrypted with the public key associated with the mobile device; and
includes a digital signature based on a private key associated with the entity.

4. The computer-readable medium of claim 1, wherein the future action is to authenticate the user for a future session with the entity.

5. The computer-readable medium of claim 1, the computer program further comprising computer-readable program code for:

determining whether the second message is received within a threshold amount of time after the first message was generated; and generating a third message including a third registration identifier different from the first registration identifier in response to determining that the second message was not received within the threshold amount of time.

6. The computer-readable medium of claim 1, the computer program further comprising computer-readable program code for:

sending a third message in response to identifying an action requiring confirmation from the user; and approving the action in response to receiving an approval message from the mobile device.

7. The computer-readable medium of claim 6, the computer program further comprising computer-readable program code for at least one of:

encrypting the third message using the public key associated with the mobile device before sending the third message;

including a digital signature based on a private key associated with the entity in the third message before sending the third message;

receiving the approval message encrypted with a public key associated with the entity; and receiving the approval message including a digital signature based on a private key of the mobile device.

8. The computer-readable medium of claim 6, the computer program further comprising computer-readable program code for:

including, in the third message, a request for a parameter associated with the action; and identifying the parameter associated with the action from the approval message.

9. The computer-readable medium of claim 1, the computer program further comprising computer-readable program code for:

generating a third message including a challenge code and a request for confirmation of an action in response to identifying the action; sending the third message; and approving the action in response to receiving a response code, wherein the response code is at least one of the challenge code and a function of the challenge code.

10. The computer-readable medium of claim 9, the computer program further comprising computer-readable program code for:

encrypting the third message including the challenge code with the public key associated with the mobile device before sending the third message.

11. The computer-readable medium of claim 1, wherein the first message is at least one of:
displayed on a user interface in clear text;
encoded into an optically-scannable image;
sent using at least one of a near field communications (NFC) link and a limited distance point-to-point radio; and
transmitted as audio.

12. The computer-readable medium of claim 9, the computer program further comprising computer-readable program code for:

including a digital signature based on a private key associated with the entity in the third message before sending the third message.

13. The computer-readable medium of claim 1, the computer program further comprising computer-readable program code for:

identifying a user identifier of the user;

wherein the computer-readable program code for associating the mobile device with the user comprises computer-readable program code for associating the user identifier with the public key associated with the mobile device.

14. The computer-readable medium of claim 1, wherein:
the first communication path includes a close-range communication link associated with a user interface for the user for the current session between the user and the entity, and
the wireless communication link is one of a WiFi communication link or a cellular communication link.

15. A non-transitory computer-readable medium embodying a computer program for registering a mobile device with an entity, the computer program comprising computer-readable program code for:
identifying, using the mobile device, a registration identifier from a first message received from the entity via a first communication path associated with a current session between a user and the entity via a data processing system associated with the user in response to a request to register the mobile device as being associated with the user to enable use of the mobile device for a future action associated with an account of the user with the entity, the mobile device not previously registered with the entity as being associated with the user;
sending, by the mobile device via a second communication path including a wireless communication link, a second message including at least one of the registration identifier and a function of the registration identifier to a data processing system associated with the entity for registration of the mobile device as being associated with the user; and
storing, by the mobile device, a public key associated with the entity for use of the mobile device with the future action associated with the account based on association of the mobile device with the user, the public key received from the entity in the first message or another message,
wherein the mobile device is associated with the user based on the at least one of the registration identifier and the function of the registration identifier in the second message being identical to at least one of the registration identifier and a function of the registration identifier in the first message.

16. The computer-readable medium of claim 15, the computer program further comprising computer-readable program code for:
receiving a third message from the entity including a code; and
displaying at least one of the code and a function of the code in a user interface of the mobile device.

17. The computer-readable medium of claim 15, the computer program further comprising computer-readable program code for:
receiving a third message from the entity including at least one of a security certificate for the entity and a digital signature based on a private key associated with the entity.

18. The computer-readable medium of claim 15, wherein the computer-readable program code for identifying the registration identifier comprises computer-readable program code for at least one of:
identifying the registration identifier from an optically-scannable image;
receiving the first message including the registration identifier using at least one of a near field communications (NFC) link and a limited distance point-to-point radio; and
identifying the registration identifier from audio received by the mobile device.

19. The computer-readable medium of claim 15, the computer program further comprising computer-readable program code for:
displaying on a display of the mobile device a request for approval of an action requiring confirmation from the user in response to receiving a third message from the entity including the request for approval; and
sending an approval message including a response to the request for approval in response to receiving an input comprising the response.

20. The computer-readable medium of claim 19, the computer program further comprising computer-readable program code for at least one of:
receiving the third message encrypted using a public key associated with the mobile device;
receiving the third message including a digital signature based on a private key associated with the entity;
encrypting the approval message using the public key associated with the entity before sending the approval message; and
including a digital signature based on a private key of the mobile device in the approval message before sending the approval message.

21. The computer-readable medium of claim 19, the computer program further comprising computer-readable program code for:
identifying a request for a parameter associated with the action in the third message; and
including the parameter in the approval message in response to receiving an input comprising the parameter.

22. The computer-readable medium of claim 19, the computer program further comprising computer-readable program code for:
requesting an input from the user associated with the mobile device to verify that the user is an authorized user of the mobile device.

23. The computer-readable medium of claim 22, wherein the requested input from the user is at least one of a personal identification number, a password, a biometric input, a predefined gesture on a touch screen of the mobile device, and a predefined pattern of movement of the mobile device.

24. The computer-readable medium of claim 15, the computer program further comprising computer-readable program code for:
receiving a user input comprising the registration identifier as clear text.

25. The computer-readable medium of claim 15, the computer program further comprising computer-readable program code for:
identifying the registration identifier from an optically-scannable image.

26. The computer-readable medium of claim 15, the computer program further comprising computer-readable program code for at least one of:
receiving the first message using at least one of a near field communications (NFC) link and a limited distance point-to-point radio; and
identifying the first message from audio received by the mobile device.

27. The computer-readable medium of claim 15, wherein the second message further includes at least one of:
- a digital signature based on a private key of the mobile device; and
- a public key associated with the mobile device.

28. The computer-readable medium of claim 19, the computer program further comprising computer-readable program code for at least one of:
- receiving the third message including a digital signature based on a private key associated with a third party; and
- encrypting the approval message using the public key associated with the third party before sending the approval message.

29. A non-transitory computer-readable medium embodying a computer program for registering a mobile device as being associated with a user with an entity, the computer program comprising computer-readable program code for:
- at least one of (i) identifying, by a data processing system associated with a third party, a first registration identifier from a first message received from the entity and (ii) generating the first registration identifier and sending, by the data processing system associated with the third party, the generated first registration identifier to the entity for delivery to the user via a first communication path associated with a current session between the user and the entity via a data processing system associated with the user;
- receiving, by the data processing system associated with the third party, a second message from the mobile device via a second communication path including a wireless communication link, the second message including a second registration identifier;
- associating, by the data processing system associated with the third party, the mobile device with the user based on the second registration identifier being identical to at least one of the first registration identifier and a function of the first registration identifier; and
- sending a third message to the entity for registering the mobile device as being associated with the user to enable use of the mobile device for a future action associated with an account of the user with the entity in response to the second registration identifier being identical to the at least one of the first registration identifier and the function of the first registration identifier, the mobile device not previously registered with the entity as being associated with the user.

30. The computer-readable medium of claim 29, the computer program further comprising computer-readable program code for:
- sending a fourth message including a request for approval of an action to the mobile device in response to receiving the fourth message from the entity; and
- sending a fifth message including a response to the request for approval to the entity in response to receiving the fifth message from the mobile device.

* * * * *